US00RE35150E

United States Patent [19]

McKenna, Jr. et al.

[11] E Patent Number: Re. 35,150

[45] Reissued Date of Patent: Jan. 30, 1996

[54] TRAY FOR FRUIT HARVESTING SYSTEM

[75] Inventors: Frank J. McKenna, Jr., Shaked Hts.; Richard K. Horst; James F. Horst, both of Orrville, all of Ohio; Charles S. Wright, Leesberg; John D. Matthews, Melbourne, both of Fla.

[73] Assignee: McKenna: Kathleen, Shaker Heights, Ohio

[21] Appl. No.: 353,520

[22] Filed: Dec. 9, 1994

Related U.S. Patent Documents

Reissue of:

[64] Patent No.: 5,228,279
Issued: Jul. 20, 1993
Appl. No.: 910,841
Filed: Jul. 6, 1992

U.S. Applications:

[63] Continuation-in-part of Ser. No. 802,362, Dec. 4, 1991, Pat. No. 5,152,129, which is a continuation-in-part of Ser. No. 572,152, Aug. 23, 1990, Pat. No. 5,136,635.

[51] Int. Cl.[6] ..... A01D 46/00

[52] U.S. Cl. ..... 56/328.1

[58] Field of Search ..... 56/328.1, 329, 56/327.1, 16.5, 12.4, 12.6, 12.8

[56] References Cited

U.S. PATENT DOCUMENTS

| | | |
|---|---|---|
| 1,504,846 | 8/1924 | Tarkington . |
| 2,395,124 | 2/1946 | Jelderks . |
| 2,450,152 | 9/1948 | Miller . |
| 2,471,326 | 5/1949 | Hoyt, Sr. . |
| 2,473,587 | 6/1949 | Huston . |
| 2,502,810 | 4/1950 | Waters . |
| 2,576,991 | 12/1951 | Bainbridge et al. . |
| 2,584,361 | 2/1952 | Morine . |
| 2,782,943 | 2/1957 | Jones et al. . |
| 2,821,312 | 1/1958 | Wiegel . |
| 2,973,112 | 2/1961 | Young . |
| 3,329,290 | 7/1967 | Lowery . |
| 3,407,582 | 10/1968 | Poehlmann . |
| 3,475,888 | 11/1969 | Staats, Sr. et al. . |
| 3,493,132 | 2/1970 | Merrill . |
| 3,523,404 | 8/1970 | Girardi . |
| 3,633,336 | 1/1972 | Rempel . |
| 3,666,126 | 5/1972 | Rempel . |
| 3,731,569 | 5/1973 | Quanrud . |
| 3,878,957 | 4/1975 | Rempel . |
| 4,064,683 | 12/1977 | Tennes et al. . |

(List continued on next page.)

OTHER PUBLICATIONS

Developments in Cirtrus Pickup Equipment, ARS-S-84, Jan. 1976 Agricultural Research Service, U.S. Dept. of Agriculture.

A New System for Raking and Picking Up Oranges, D. B. Churchill, H. R. Summer, reprinted from Transactions of the ASAE (American Society of Agricultural Engineers), vol. 20. No. 4, pp. 617, 618, 619, 620, 1977.

Florida Citrus Harvesting Research—Past History, Current Status, Proposed Research and Fund Needs, Jodie D. Whitney, Citrus Research and Education Center, University of Florida.

Status of Citrus Harvesting in Florida, Jodie D. Whitney and Roy C. Harrell, Journal of Agricultural Engineering Research, vol. 42, pp. 285–299 (1989).

Tree spacing studies: how close is close?, Jim Fisher, The Citrus Industry, Feb. 1990.

Citrus Fruit Handling Video.

*Primary Examiner*—Michael Powell Buiz

*Attorney, Agent, or Firm*—Renner, Otto, Biosselle & Sklar

[57] ABSTRACT

A fruit harvesting apparatus is provided which includes a vehicle, a mechanism for moving the vehicle along the ground; a tray, coupled to the vehicle, for receiving picked fruit; a pivotable hopper, mounted to the vehicle, for temporarily storing the picked fruit; and a transfer system for transferring the picked fruit from the tray to the hopper. The apparatus further includes an elevator for selectively elevating the device and/or a titling device for selectively tilting the device.

43 Claims, 18 Drawing Sheets

U.S. PATENT DOCUMENTS

| | | |
|---|---|---|
| 4,320,995 | 3/1982 | Tennes et al. . |
| 4,395,867 | 8/1983 | Cooper et al. . |
| 4,558,561 | 12/1985 | Mendenhall . |
| 4,603,544 | 8/1986 | Hayhurst . |
| 4,718,223 | 1/1988 | Suzuki et al. . |
| 4,736,574 | 4/1988 | Walker . |
| 4,899,527 | 2/1990 | van den Munckhof et al. . |
| 5,001,893 | 3/1991 | Stanley et al. . |
| 5,007,772 | 4/1991 | McKenna et al. . |
| 5,125,223 | 6/1992 | McKenna et al. . |
| 5,152,129 | 10/1992 | McKenna et al. . |

TRAY FOR FRUIT HARVESTING SYSTEM

Matter enclosed in heavy brackets [ ] appears in the original patent but forms no part of this reissue specification; matter printed in italics indicates the additions made by reissue.

RELATED APPLICATIONS

This application is a continuation-in-part of copending U.S. application Ser. No. 07/802,362 which is entitled "TRAY FOR FRUIT HARVESTING SYSTEM" and which was filed on Dec. 4, 1991. U.S. application Ser. No. 07/802,362 is a continuation-in-part of U.S. application Ser. No. 07/572,152 which is entitled "HARVESTING APPARATUS AND METHOD" and which was filed on Aug. 23, 1990. The entire disclosures of these earlier applications are hereby incorporated by reference.

FIELD OF THE INVENTION

This invention generally relates to a self-propelled mechanical harvesting apparatus which enables multiple workers to more efficiently pick and collect citrus fruit from citrus trees. More particularly, the present invention relates to a tray for a fruit harvesting system which may be selectively elevated and/or which may be selectively tilted. Additionally or alternatively, a transfer system, which transfers picked fruit from the tray to a hopper, extends over a side wall of the tray.

BACKGROUND AND SUMMARY OF THE INVENTION

Citrus fruits are generally harvested by hand picking and the conventional harvesting method includes the use of pick sacks, pallet tubs, and expensive in-grove vehicles with booms. More specifically, during a typical harvesting operation, a citrus fruit picker picks the fruit from a tree and places it in a pick sack which is carried over his/her shoulder. When the pick sack is full, the fruit picker carries it to a pallet tub and lifts the sack about thirty inches to empty the fruit into the pallet tub. and then returns to the same or a next tree with an empty sack to repeat the cycle. The height of the top edge of the conventional pallet tub is approximately thiry (30) inches from the ground.

A full pallet tub will commonly have a ten box acapacity and will weigh about nine hundred pounds. A full tub will usually be emptied shortly after it is filled by an expensive in-grove vehicle with a boom, such as a field truck or "loader" (sometimes also called a goat) which moves along with the pickers during the harvesting process. A loader is a modified truck equipped with a rotatably mounted hydraulic boom specifically designed to lift and empty a fruit filled pallet tub into the loader's bed or hopper. The loader's bed is designed so that it may empty the fruit into a trailer which then hauls the fruit to a processing plant.

In a conventional harvesting operation, a large number of pallet tubs are strategically placed throughout the grove so that they will be substantially filled during a harvesting operation. Thus, the distance between the respective pallet tubs will be determined by the amount of citrus fruit on the trees between the pallet tubs. For example, in established citrus groves with "high density trees", the tubs will be arranged relatively close to one another. More particularly, a "high density" orange grove, or one having trees which are eight to ten years old, will yield about 1,100 oranges per tree. An average picker harvesting high density trees will fill his/her pick sack with about 45 pounds of fruit and empty the sack about 200 times a day.

In the above-identified applications, a fruit harvesting apparatus is disclosed which is particularly adapted for harvesting young citrus groves with "low density" trees. (For example, a low density orange grove will contain young trees which are two to four years old and which average about eight to twelve oranges a tree per year). The apparatus includes a vehicle having a front end and a back end, and means for moving the vehicle along the ground. A tray is mounted to the vehicle (preferably the front end of the vehicle) for receiving the picked fruit and a pivotable hopper is mounted to the back end of the vehicle for temporarily storing the picked fruit. A transfer system is provided for transferring picked fruit from the tray to the hooper. The transfer system connects with the tray opening in such a manner that a smooth transition surface is formed between the tray and the transfer system. Initial experimental field tests indicate that such an apparatus results in a substantial increase in production when compared to that realized with pallet tubs and expensive loaders.

One design feature addressed in the previous applications concerned the height of the tray from the ground. More particularly, it si important that the height of the tray be such that lifting and emptying a potentially heavy container, such as a pick bag, does not unduly task the fruit picker. By providing a tray which has a top edge about twenty-four (24) inches from the ground, the tray is about six inches lower than a conventional pallet tub, requiring less effort to empty a pick sack into the tray as was previously required to empty a pick sack into a pallet tub. In such an arrangement, the side walls of the tray are approximatley twelve (12) inches tall and thus the bottom wall of the tray is approximately twelve (12) inches from the ground.

The apparatuses disclosed in the above-identified applications were directed towards low-density harvesting operations. In contrast, the present application is directed towards improvements which, although useable in low-density harvesting operations, are particularly beneficial in high-density harvesting operations. One such improvement is positioning the tray so that its top edge is as close as possible to the ground. This positioning of the tray is extremely desirable because it reduces the height that a picker is requried to lift his/her pick sack to empty it. As was indicated above, the top edge of a conventional pallet tub is thirty inches from the ground. As was also indicated above, an average picker harvesting high-density trees fills his/her pick sack with about 45 pounds of fruit and empties his or her pick sack about 200 times a day. Thus, eliminating the conventional pallet, and instead using a tray which has a top edge positioned, at about, for instance, five inches from the ground, saves an average picker the effort required to lift a 45 pound sack an extra twenty-two to twenty-four inches every time he/she empties the sack. In a single day, the average savings when using the tray would be approximately 370 feet.

By lowering the height of the top edge of the tray, the bottom wall of the tray is also lowered, preferably to a point essentially contacting, or resting, on the ground. In less then perfectly flat terrains (which most harvesting orchards are) such a positioning of the bottom wall would not provide sufficient ground clearance when moving the vehicle. Accordingly, the tray of the present invention is preferably selectively elevatable so that the bottom wall of the tray will have sufficient ground clearance when moving the vehicle. In this manner, the tray may be elevated prior to moving the vehicle and then lowred to receive fruit from the pickers.

This feature is believed to be particularly advantageous in high-density harvesting operations because the machine remains in one position for long periods of time. Nonetheless, in some low-density situations, the reduction in labor due to the decreased height of the top edge of the tray may justify continuous elevation changes in the tray.

Thus, the selectively elevatable tray of the present invention solves the "ground clearance" problem while at the same time allowing the tray to be positioned at the desired "low" height. However, the lower positioning of the tray appeared to sometimes complicate other design features of the apparatus. Specifically, in the above-identified applications, the disclosed tray included an opening in one of its side walls which allowed a smooth transition surface between the tray and the transfer system. This smooth transition surface appeared to be sacrificed when the tray was lowered to the desired height because the angle between the tray and the transfer system decreased (or becomes more acute) which in turn increased the chance for clogging. The present invention is believed to solve this problem by positioning or extending the transfer system over the back wall in such a manner that a smooth transition surface is formed between a tray outlet and the transfer system, regardless of the height of the tray.

Additionally or alternatively, the tray of the present invention is selectively tiltable, thereby further guaranteeing a smooth transition between the tray outlet and the transfer system. This feature also allows the adjustment of the slope of the bottom wall when the terrain of the grove requires. Also, the tiltability of the tray, allows the fruit harvesting apparatus to negotiate culverts and other analogous obstacles. While the preferred fruit harvesting apparatus includes both an elevating assembly and a tilting assembly, the present invention contemplates the use of either of these assemblies independently in an apparatus.

These and other features of the invention are fully described and particularly pointed out in the claims. The following descriptive annexed drawings set forth in detail certain illustrative embodiments. However these embodiments are indicative of but a few of the various ways in which the principles of the invention may be employed.

DETAILED DESCRIPTION

Figure 1:
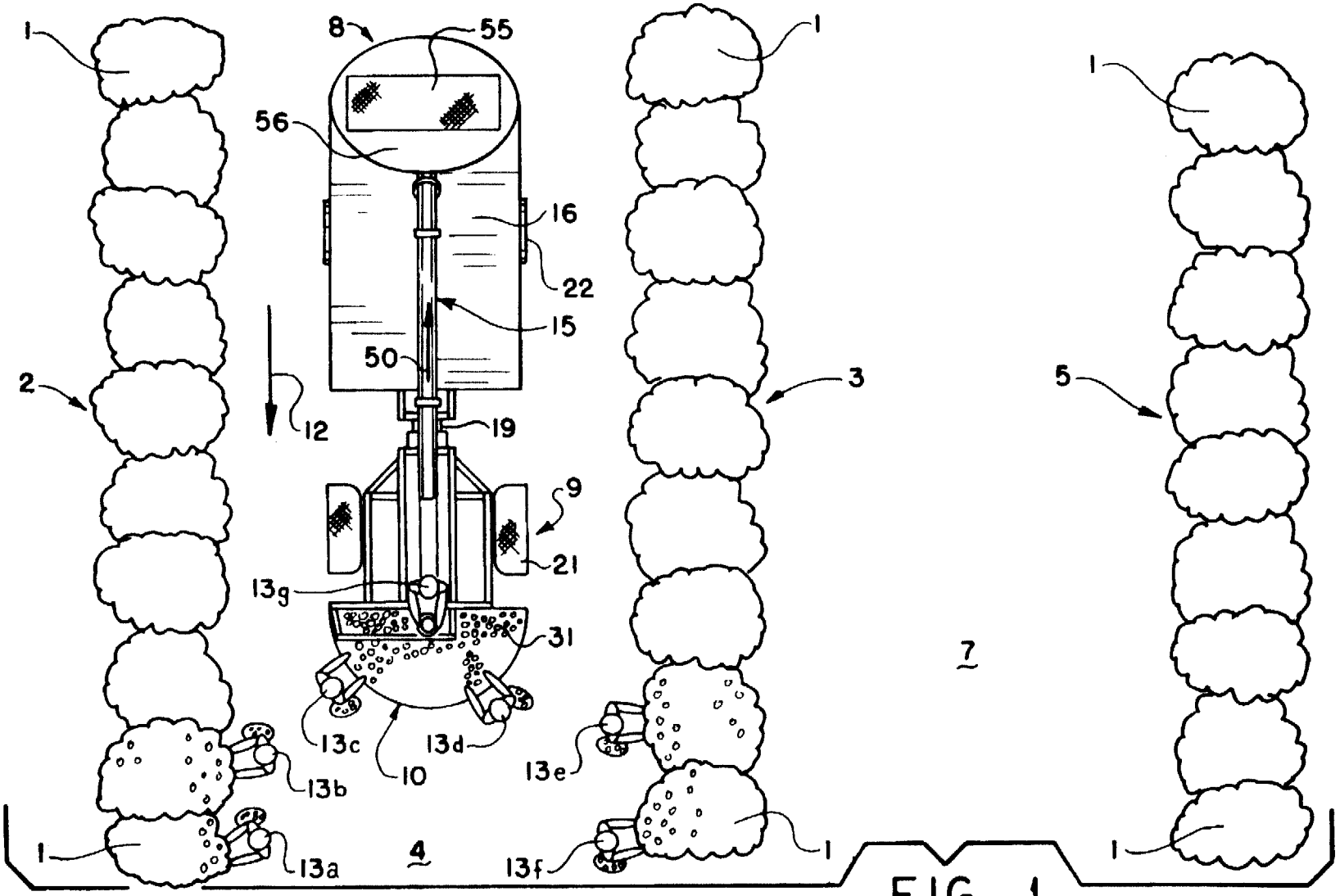
FIG. 1 is a schematic plan view showing the fruit harvesting apparatus of the present invention in operation with a picking crew moving along an aisle between rows of citrus trees.

Referring now to the drawings in detail and initally to FIG. 1, a plurality of young citrus trees 1 have been planted in close proximity to one another in a first row of citrus trees, identified generally by the reference numeral 2. A second row of young citrus trees, identified generally by the reference numberal 3, has been planted substantially parallel to the first row 2. Parallel rows 2 and 3 of citrus trees 1 define therebetween an aisle 4. Similarly, a third row of relatively young citrus trees, identified generally by the reference numberal 5, is planted in generally parallel relationship to the second row of citrus trees 3. The citrus trees in rows 3 and 5 define therebetween a second aisle 7. A number of these generally parallel rows of citrus trees defining aisles therebetween are planted on large plots of land to form a citrus tree grove.

As a result of several freezes over the past decade, many new citrus trees have been planted to replace trees lost in the freezes. The trend is to plant these new trees closer to one another in rows having narrower aisles therebetween. The present invention is directed to a fruit harvesting apparatus, indicated generally at 8, and a method for operating the same to economically pick fruit from low density young cirtus trees planted in this more densley packed grove configuration.

The fruit harvesting apparatus 8 includes a self-propelled vehicle, indicated generally at 9, equipped with either two or four wheel drive, as required, for movement in either a forward or reverse direction. The vehicle 9 has a semi-circular tray, indicated generally at 10, mounted to the front end thereof. Picked citrus fruit is placed in the tray 10 by multiple persons, who have picked that fruit from the citrus trees in front of and immediately adjacent to the vehicle 9.

The citrus fruit picking crew normally consists of four to ten persons moving along in front of or to the side of the vehicle 9. The vehicle is being driven along the aisle 4 in the direction of arrow 12. The size of the crew is dependent, among other things, upon fruit density, tree spacing and manpower availability.

As shown, six persons, respectively idenified as 13A–13F in FIG. 1, are being utilized for picking, with a seventh person, identified as 13G, driving the vehicle 9. Pickers 13A and 13B are removing citrus fruit from trees 1 in row 2 and placing that fruit into sacks (or other containers) carried on their respective shoulders. Pickers 13E and 13F are shown as picking fruit from citrus trees 1 in row 3 and placing the picked fruit in sacks carried over their respective shoulders. Pickers 13C and 13D are placing the picked fruit from their full shoulder sacks into tray 10. The driver 13G acts as a supervisor for the crew of pickers 13A through 13F.

These pickers are usually immediately in front of and adjacent to the vehicle 9 and may be readily observed by and in oral communication with supervisor 13G. By substantially continuously moving vehicle 9 in the direction of arrow 12, the supervisor 13G is able to establish a comfortable picking speed for the pickers 13A–13F to control the speed of the fruit harvesting operation. The substantially continuous movement of the vehicle 9 also minimizes the distance between the respective pickers 13A through 13F and the tray 10 to reduce the distance that the pickers must walk to deposit the citrus fruit from their filled sacks into the tray 10.

This tray 10 is mounted on the vehicle 9 adjacent the ground at a convenient height for the pickers to place the fruit into the tray. A tray height from the ground of from 2 to 2½ feet would be preferred for this purpose.

The picked fruit deposited in tray 10 is pneumatically conveyed from the tray 10 through a duct transfer system, indicated generally at 15, to a generally cylindrical hopper 16 pivotally mounted on the back portion of vehicle 9. The hopper 16 has a capacity to hold approximately ninety boxes of oranges. When the hopper 16 becomes substantially full, the picked citrus fruit temporarily stored in hopper 16 is dumped into the goat or a trailer for delivery to a collection site. The details of the vehicle 9, tray 10, duct transfer system 15 and hopper 16 are best illustrated and described in the context of FIGS. 2 and 3.

Figure 2:
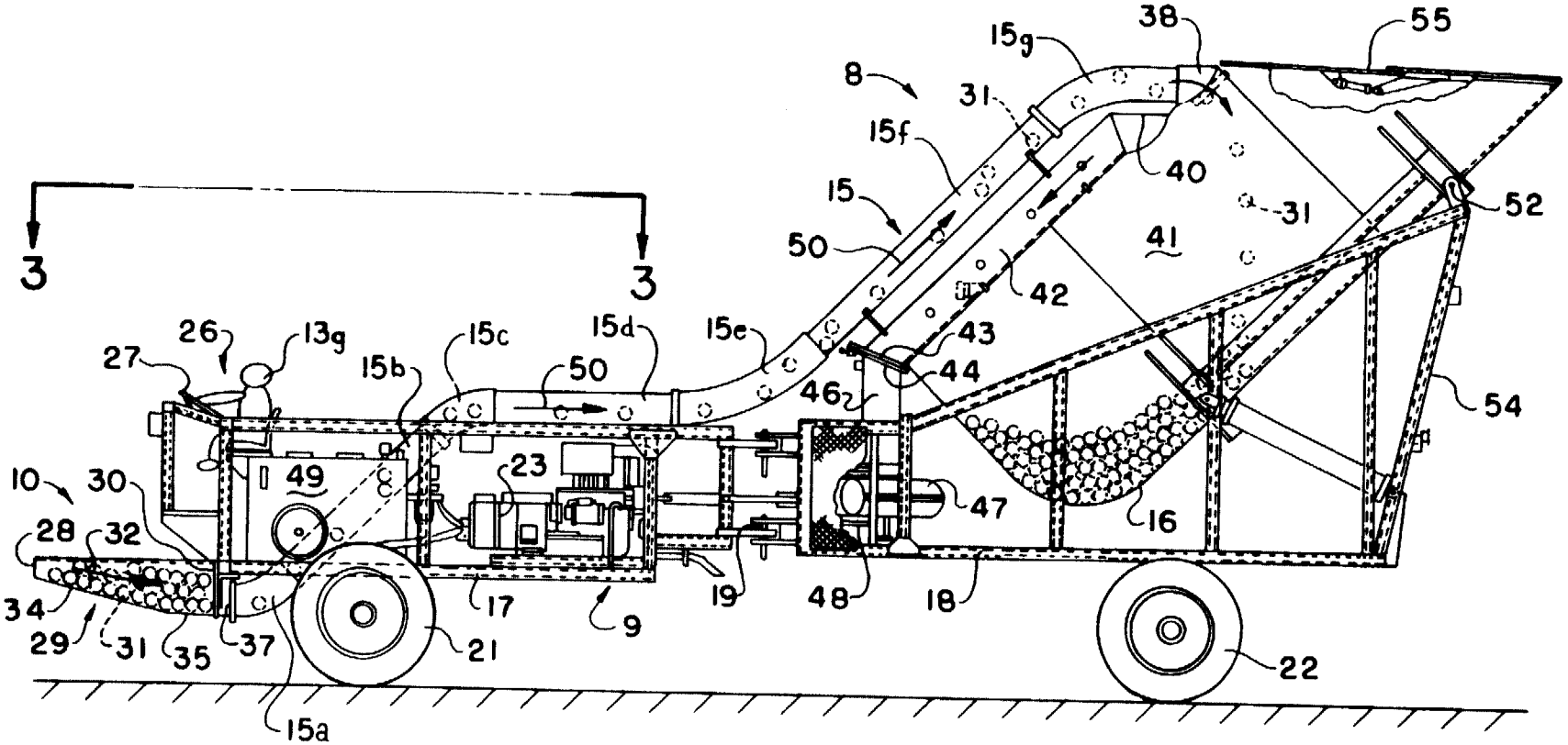
FIG. 2 is a side elevation of the fruit harvesting apparatus illustrating fruit beint conveyed from the front tray through the transfer duct system to the hopper.
Figure 3:
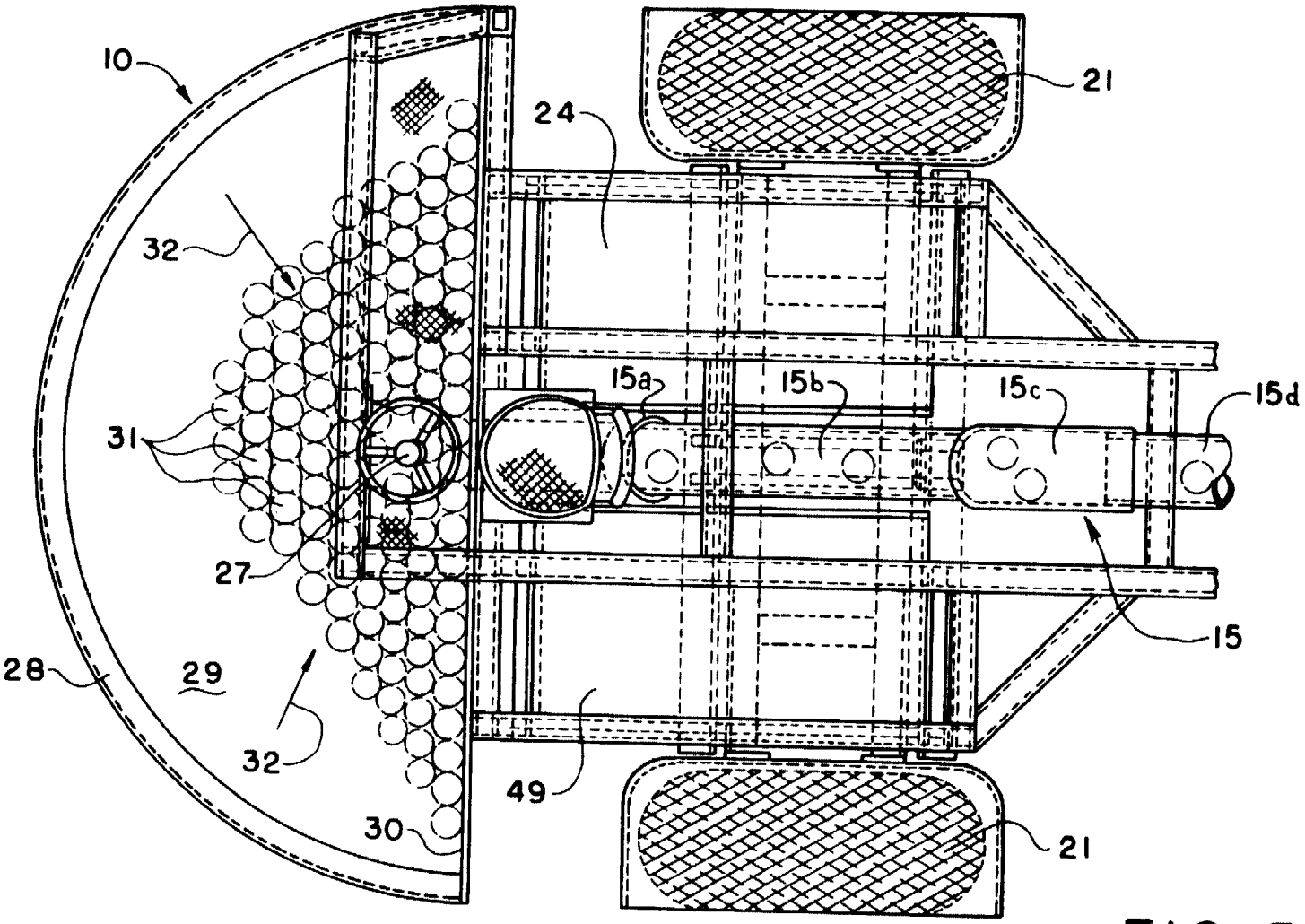
FIG. 3 is a partial plan view of the fruit harvesting apparatus taken generally along the plane 3—3 illustrating the semi-circular front, tray and the driver console area.

Referring initially to FIG. 2, the vehicle 9 includes front chassis assembly 17 and a rear chassis assembly 18. The front and rear chassis are hinged together as indicated at 19 to form a pivotal articulation axis therebetween generally along the axial centerline of the vehicle to assist in steering. A pair of front wheels 21 are rotatably mounted on front chassis 17, and a pair of rear wheels 22 are rotatably mounted on rear chassis 18. As is well known in the vehicle art, the front wheels 21 can be driven, the rear wheels 22 can be driven or all four wheels can be driven depending upon the desired application. A diesel engine 23 is mounted on and contained within the front chassis assembly 17 to drive the hydraulic pumps which activates the hydrostatic device to turn the wheels either forwardly or rearwardly. A fuel tank 24, as shown in FIG. 3, is mounted on the front chassis assembly 17 for supplying diesel fuel to the diesel engine 23.

The driving console section., indicated generally at 26, is positioned at the front of vehicle 9 in a relatively elevated, preferably central, position to provide good sight lines for the operator 13G. The driving console section 26 includes a steering wheel 27 for steering the vehicle 9 and contains additional conventional controls (not shown) for controlling the direction and speed of the vehicle 9 during the harvesting process in which citrus fruit is deposited in the tray 10. In addition, the driving console section includes actuators for controlling the dumping action of the hopper 16.

The tray 10 preferably has a semi-circular configuration in plan view and may extend substantially the entire width of the vheicle 9. A vehicle and tray width of approximately eight feet may be advantageous for younger trees planted in more dense configurations.

The tray 10 includes a semi-circular front wall 28, in open top, a downwardly sloping and curved bottom wall, indicated generally at 29, and a back wall 30. The bottom wall 29 slopes downwardly from the front wall 28 to the back wall 30 adjacent the front part of the vehicle 9. The downward slope of bottom wall 29 is preferably at an angle of up to about 20° relative to the horizontal. The bottom wall is also curved in a frusto conical sense to direct fruit radially inwardly toward the center of the back wall. This sloped and curved bottom wall gravity feeds the picked citrus fruit 31, which has been placed in tray 10 through the open top thereof, rearwardly, downwardly and radially inwardly relative to the vehicle 9, as generally indicated by the arrow 32 in FIGS. 2 and 3.

The downwardly sloped bottom wall 29 of tray 10 may be formed into discrete sections 34 and 35, if desired. The first section 34 may have a steeper downward slope than second bottom section 35. By utilizing two bottom wall sections, the citrus fruit is gradually and gently conveyed rearwardly, downwardly and radially inwardly to the inlet of duct transfer system 15 without damaging the fruit 31.

The tray 10 has a tubular flanged outlet opening 37 positioned at the bottom of back wall 30 of tray 10 at the center thereof. The tubular flange opening 37 is connected to the forward end of duct transfer system 15. The duct transfer system includes a plurality of interconnected hollow duct sections.

The forward or first section 15A is a flexible duct sealingly connected at its forward end to the tubular outlet opening 37 in tray 10. The second rigid and straight duct section 15B of the transfer system 15 is sloped upwardly from front to back and extends between and communicates with first flexible elbow duct section 15A and third flexible elbow duct section 15C. Fourth rigid duct section 15D is generally straight and extends horizontally between and communicates with third flexible elbow duct section 15C and fifth flexible elbow duct section 15E. Sixth rigid and straight duct section 15F is sloped upwardly from front to rear and extends between and communicates with fifth flexible elbow duct section 15E and seventh flexible elbow duct section 15G. The rear end of flexible elbow duct section 15G is sealingly connected to tubular orifict 38 at the upper inlet end of hopper 16.

As best seen in FIGS. 1 and 3, the duct transfer system 15 including duct sections 15A through 15G extend substantially along the axial centerline of the vehicle 9. The flexible elbow duct sections 15A, 15C, 15E and 15G permit the transfer system ducts to be elevated from the bottom of the tray 10 to the top of the hopper 16 in smooth arcuate gradations having relatively large radii to permit the smooth flow of citrus fruit therethrough.

The tubular orifice 38 may be 14 to 15 feet above ground level. The fruit being pneumatically conveyed through the transfer duct system is thus elevated approximately 12 to 13 feet along the length of the duct system, which can run approximately 30 to 35 feet. The axial orientation of the duct transfer system with gradual curves being provided by the flexible elbow duct sections for elevation purposes permits a relatively large diameter duct to be used, for example inches, to reduce clogging and fruit bruising or damage. To move fruit through the duct transfer system 15 from the tray 10 to the hopper 16, a pneumatic conveyance system is provided.

For this purpose, the hopper is provided with an outlet elbow 40 adjacent the tubular inlet opening 38. Elbow 40 communicates between the cavity 41 of hopper 16 and a vacuum tube 42 extending along one sidewall of the hopper 16. The bottom end of vacuum tube 42 has a flange 43 thereon which is normally sealed to a confronting flange 44 at the top of vertical vacuum tube 46. Vacuum tube 46 extens downwardy into blower 47, which is run by a hydraulic motor 48 mounted on the rear chassis 18 of frame 9. The hydraulic fluid tank 49 is positioned parallel to and opposite from diesel gas tank 24, with the duct transfer system 15 passing therebetween. The hydraulic fluid tank 49 contains a reservoir of hydraulic fluid allowing the hydraulic motor 48 to be selectively run on a continuouse basis to in turn continuously run the blower 47.

The variable speed blower 47 draws air downwardly through vacuum tubes 42 and 46 to create a vacuum or sub-atmospheric condition within the cavity 41 of hopper 16. The blower operation and vacuum condition created thereby also draws air through the duct transfer system 15 from the tray 10 to the hopper 16, as indicated by arrows 50. This air movement pneumatically conveys the citrus fruit 31 delivered to the entrance of duct section 15A through the entire duct system and thence into the hopper. This pneumatic conveyance system delivers picked citrus fruit from the tray 10 through the duct transfer system to the hopper faster than pickers can deposit the fruit into the tray 10. Thus, the fruit harvesting apparatus 1 of the present system can be substantially continuously used along the aisles of the grove until the hopper 16 is substantially full of fruit. The pneumatically conveyed fruit passes through the tubular inlet opening 38 and enters the hopper, with the entrance orifice to elbow 40 of the vacuum tube system being covered by a screen or the like to preculude citrus fruit from being sucked therethrough.

Figure 14:
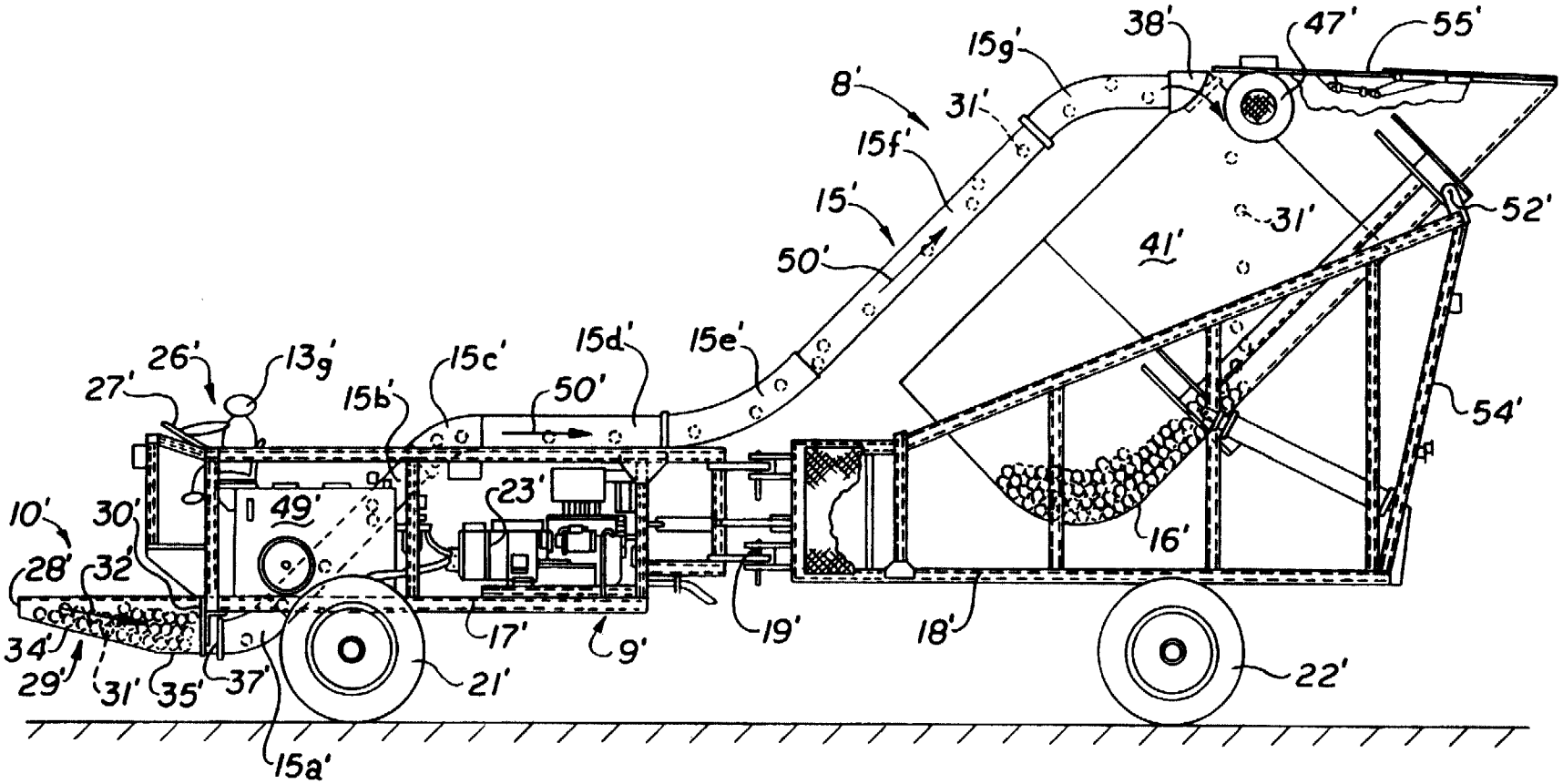
FIG. 14 is a view similar to that of FIG. 2, except showing the blower inside the hopper.

Alternatively, as is shown in FIG. 14, a variable speed blower 47' may be attached to the an inside upper portion of the hopper adjacent the tubular inlet opening 38. In such a system, the blower 47' draws air in the hopper upwardly to create a vacuum or sub-aimospheric condition within the cavity 41 of the hopper 16. This arrangement is believed to elimate noise and redirect the exhaust air to the atmosphere above and away from the worker which is desirable. One may appreciate that with the blower 47', the components 40, 42, 43, 44, and 46 are not necessary.

When substantially filled, the hopper 16 can be pivoted from its normal receptin position illustrated in FIG. 2 to its pivotally elevated dumping position. To this end, the hopper 16 is pivotally connected to the upper back end of rear chassis 18, as indicated at 52. Two transversely spaced piston cylinder assemblies 53 extend between a back support frame 54 on rear chassis 18 and the sidewall of the hooper 16. Selective extension of the piston rod of piston cylinder assemblies 53 is operative to pivot the hopper 16 about pivotal connection 52.

To provide clearance for this pivotal movement, the forward end of sixth duct section 15F and the rearward end of fifth flexible duct section 15E are disconnected from one another. Similarly, flanges 43 and 44 are disconnected from one another to uncoupled vacuum duct 42 from vacuum duct 46. With these disconnections made, the hopper 16 is free to arcuately move around pivot connection 52 when the piston rod of piston cylinder assemblies 53 are extended.

When the piston rods are fully extended, the hopper has been pivotally moved to its dumping position. An outlet door 55 is positioned in top wall 56 of the hopper 16. With the hopper in its dumping position, the hopper wall 56 and fruit outlet door 55 are generally below the cavity 41 of the hopper and directly above the bed of a trailer positioned to receive the fruit. A piston cylinder assembly 57 is operative to open the door 55 to allow the fruit to be gravity fed from the hopper 16 to the bed of the trailer. In the dumping position, the hopper is inclined upwardly from back to front at a gentle slope or angle to allow the fruit to gradually be gravity fed from the cavity of the hopper to the bed of the trailer.

On occasion, the fruit harvesting vehicle of the present invention will be used with a fruit transporting vehicle having a higher fruit receiving bed and/or higher trailer sidewalls. To provide compatibility between the fruit harvesting vehicle and fruit trailers of all sizes, the hopper of the present invention in an alternative embodiment can be selectively vertically elevated prior to dumping, if necessary.

Figure 9:
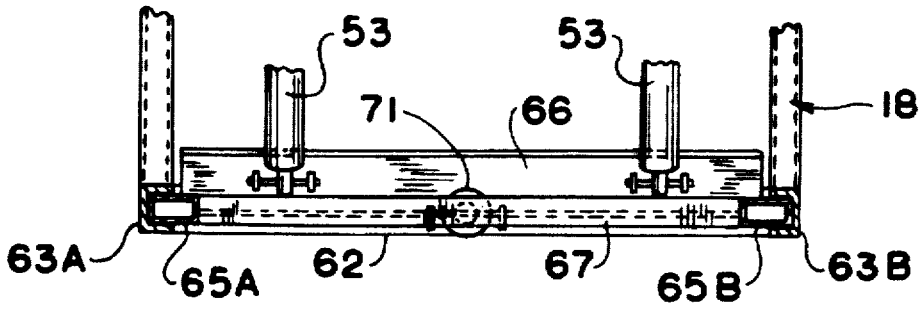
FIG. 9 is a horizontal cross section taken on the plane 9—9 of FIG. 8 showing the guidance of the movable frame relative to the fixed frame.

As viewed in FIGS. 7 through 10, the rear chassis assembly 18 includes a fixed rear frame, indicated generally at 60, and a vertically movable rear frame, indicated generally at 61. The fixed rear frame 60 includes a base, fixed channel 62 extending horizontally across the width of the rear chassis 18. Teh fixed frame further includes two parallel side channels 63A and 63B fixed to and extending upwardly from base channel 62. As best shown in FIG. 9, the side channels 63 face inwardly toward one another to provide guidance for the selective vertical movement of the movable back frame 61.

The movable back frame 61 includes two generally vertically extending parallel tubular side posts 65A and 65B. These tubular side posts are interconnected and rigidified by generally horizontal cross members comprising lower cross angle 66, middle I beam 67 and upper cross beam 68. Lower, middle and upper cross members 66 through 68 extend between and are connected to side posts 65A and 65B to form the rigid movable back frame assembly 61.

As best illustrated in FIG. 9, the tubular side posts 65A and 65B are respectively slidingly received in channels 63A and 63B of the fixed rear frame 60 to permit relative movment therebetween. This vertical movement of the movable rear frame 61 relative to the fixed frame 60 is selectively provided by a piston cylinder assembly 71 extending between base channel 62 of the fixed frame and the middle I beam 67 of the movable frame 61. Extension of the piston rod of piston cylinder assembly 71 will elevate the movable frame 61 relative to the fixed frame 60, with such vertical movement being guided by channels 63A and 63B and 63B on the fixed frame. Similarly, selective retraction of the piston rod of piston cylinder assembly 71 will lower the movable frame 61. The selective vertical movement of the vertically movable back frame 61 will result in concurrent vertical movement of the hopper 16.

For this purpose, the transversely spaced piston cylinder assemblies 53 have their distal and pivotally connected to lower angle 66 of the rear movable frame. The piston rods of the piston cylinder assemblies 53 are pivotally connected at their respective proximal ends to the lower wall portion of hopper 16. The piston cylinder assemblies 53 thus extend between and are pivotally connected at their opposite ends to the rear movable frame 61 and the hopper 16. Similarly, the transversely spaced pivotal connections 52 of the hopper 16 to the movable frame 61 are positioned on the upper tubular beam 68 of that movable frame 61. Therefore, when the movable frame 61 is elevated, the connection between the movable frame and the hopper (as provided by the piston cylinder assemblies 53 and the hinge connections 52) results in the hopper 16 concurrently vertically moving with the movable frame assembly 61.

Figure 10:
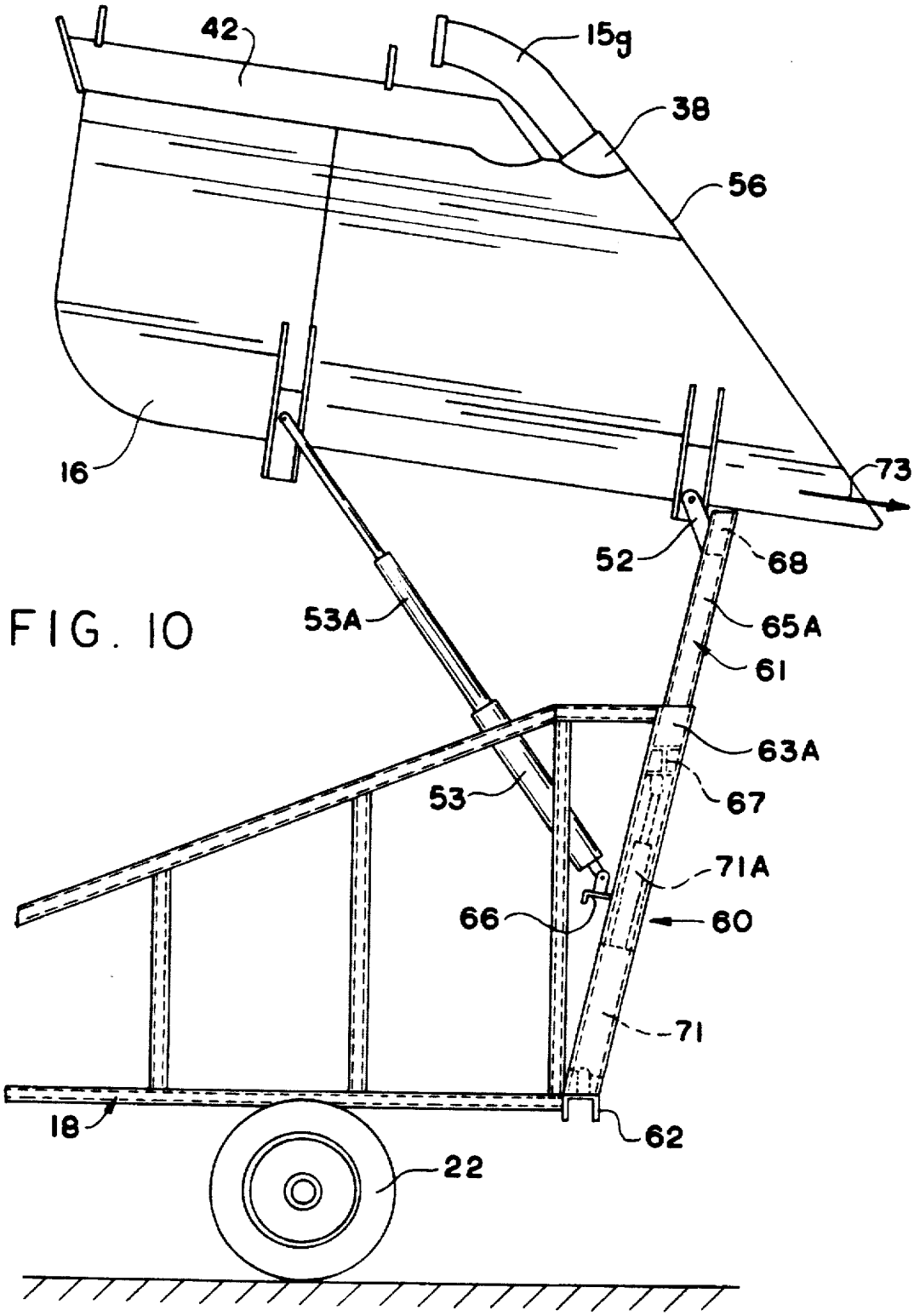
FIG. 10 is a partial side elevation similar to FIG. 7. but showing the hopper in an elevated and pivoted position to dump the fruit into a fruit transfer vehicle.

The operation of the mechanism for selectively vertically elevating hopper 16 is believed apparent from the above description but is described hereinafter in the context of FIG. 10 for purposes of completeness. When the trailer body of the fruit conveyance vehicle has an elevated bed and/or elevated sidewalls, the piston cylinder assembly 71 is activated to vertically extend the piston rod 71A thereof to concurrently raise the entire rear movable frame 61 and hopper 16. When thus elevated to provide an additional vertical clearance of up to 10 feet (as required), the piston cylinder assemblies 53 are actuated. Vertical extension of the piston rods 53A of piston cylinders 53 pivots the hopper 16 about hinge connections 52 to the position illustrated in FIG. 10. In such position, the hopper is inclined slightly relative to the horizontal from front to back. The outlet door 55 is opened to allow the contained fruit to dump into the transport railer in the direction indicated generally by arrow 73 in FIG. 10.

When the dumping is complete, the piston rods 53A of piston cylinder assemblies 53 are retracted to pivot the hopper 16 about hinges 52 to return the hopper to its normal "picking" position. Piston rod 71A of piston cylinder assembly 71 is then retracted to lower the movable frame 61 to in turn lower the hopper into its position within the side framework on the rear chassis 18. The hopper 16 is then in position to have ducts 15 E and F and flanges 43 and 44 reconnected in preparation from the next picking cycle.

Figure 4:
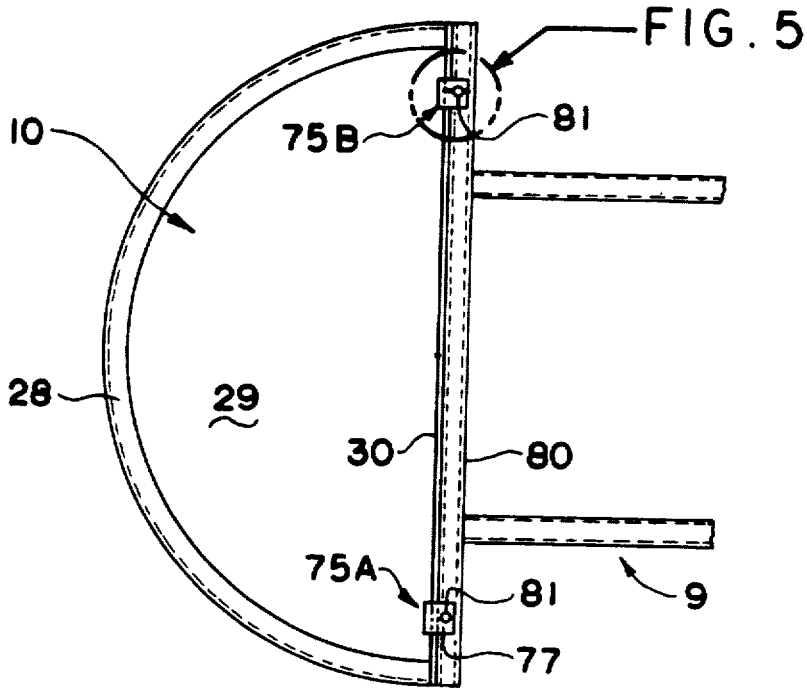
FIG. 4 is a plan view of a tray removably secured to the chassis frame of a fruit harvesting vehicle.
Figure 5:
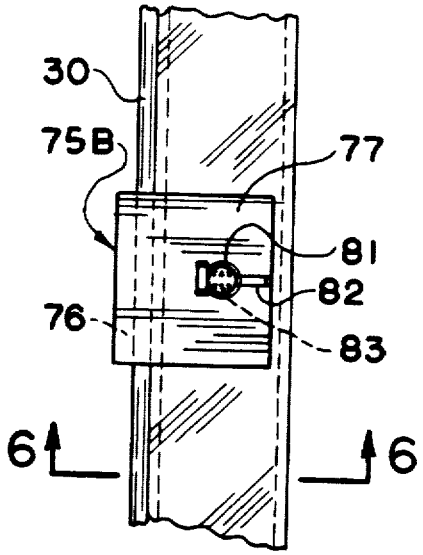
FIG. 5 is an enlarged plan view of one of the selectively removable tray mounts, with this enlarged mount being identified as to its position relative to the vehicle by the circled portion of FIG. 4.
Figure 6:
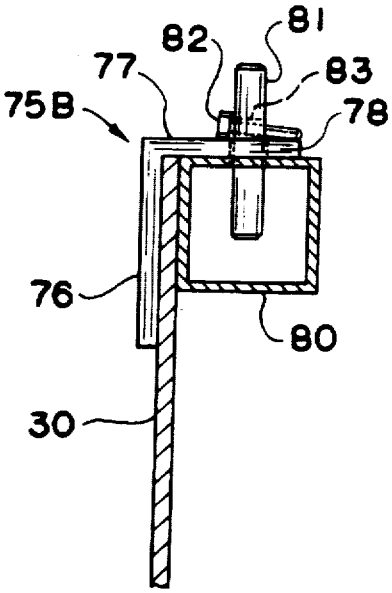
FIG. 6 is a vertical cross section taken generally along the plane 6—6 of FIG. 5 showing the L-shape mounting bracket for the tray.
Figure 7:
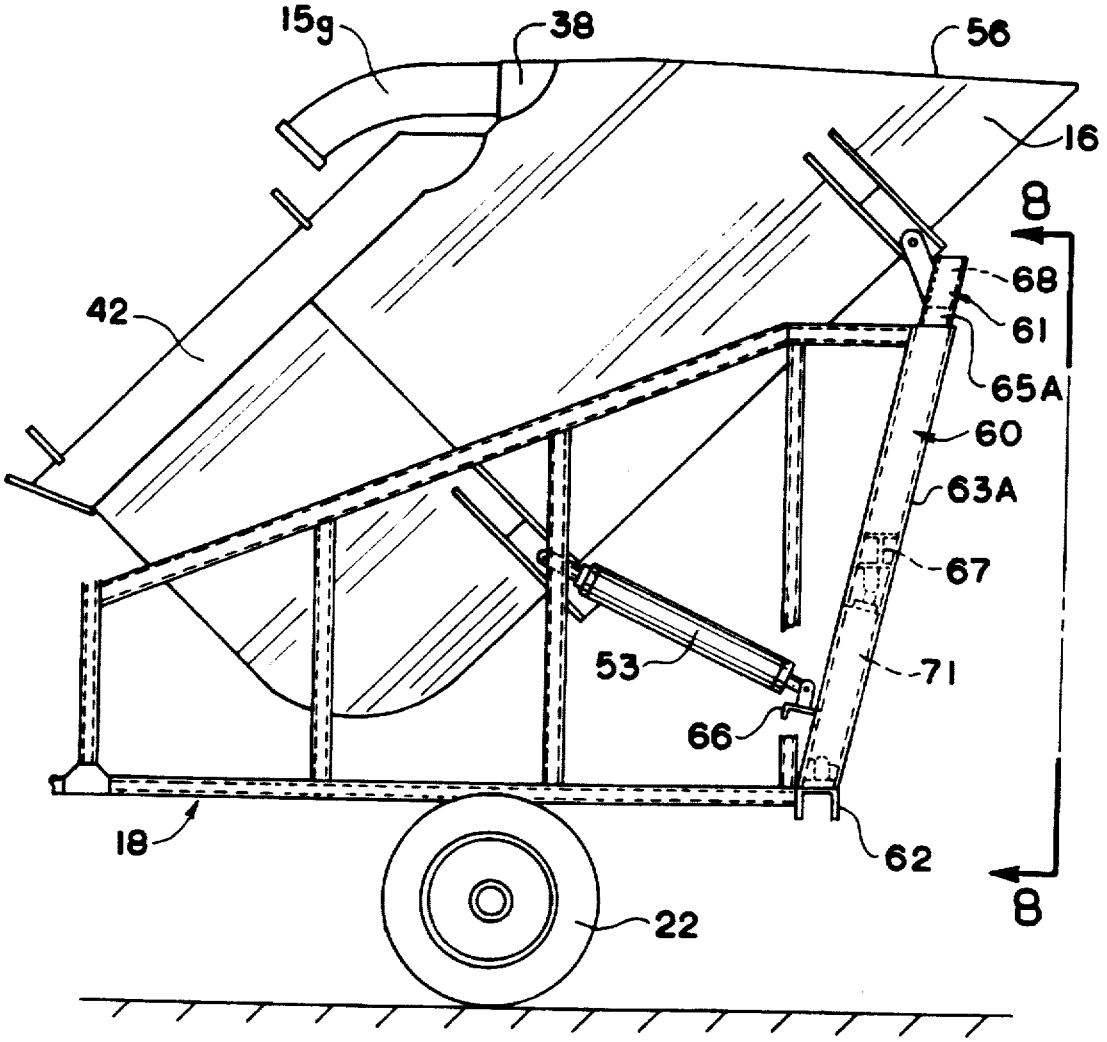
FIG. 7 is a partial side elevation similar to the back end of FIG. 3 illustrating alternative frame structure for selectively elevating the hooper relative to the vehicle.
Figure 8:
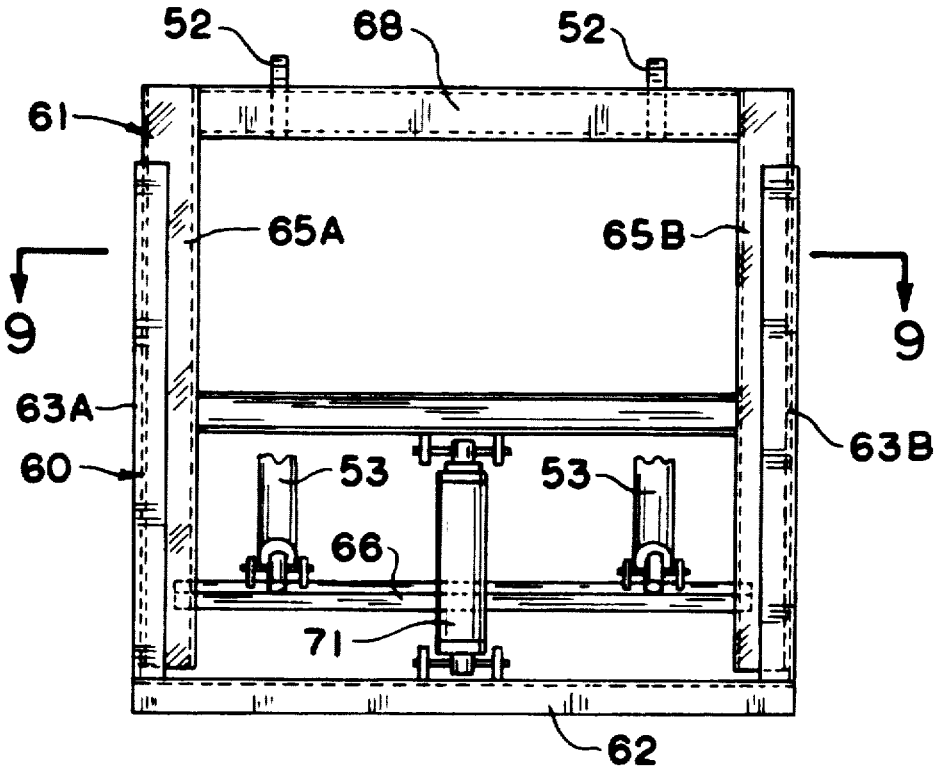
FIG. 8 is a rear elevation taken along the plane 8—8 of FIG. 7 showing the details of the fixed and movable frames selectively allowing the hopper to be raised or lowered.

It will be apparent from the foregoing that changes may be made in the details of construction and configuration without departing from the spirit of the invention as defined in the following claims. For example, the tray 10 on the front of vehicle 9 can be adapted to allow the tray to be selectively removably mounted on that vehicle, as illustrated in FIGS. 4 through 6.

For this purpose, the back wall 30 of the tray 10 may have two transversely spaced L-shaped mounting brackets, indicated generally at 75A and 75B, mounted thereto. Each of these mounting brackets is identical and mounting bracket 75B is illustrated for purposes of explanation in FIGS. 5 and 6.

L-shape mounting bracket 75B includes a vertical leg 76 and a horizontal leg 77. Vertical leg 76 of the mounting bracket is fixedly secured to the front surface of back wall 30 of tray 10. The horizontal leg 77 of L-shape mounting bracket 76B extends over and beyond the top of tray back wall 70. The horizontal leg 77 has a hole 78 positioned therein selectively to cooperate with a fixed post on the frame of the front chassis 17 of vehicle 9.

Such chassis frame includes a tubular cross brace 80 extending transversely of the vehicle near or at the front thereof. The tubular cross brace 80 has a vertically extending post 81 rigidly secured to its top wall. The tray 10 is lowered into position with the post 81 being received in the hole 78 in horizontal leg 77 on the L-shape mounting bracket 75. A retention pin 82 is then inserted through a bore 83 in the upstanding portion of post 81 to retain the mounting bracket 75B in position. In such position, the horizontal leg 77 rests against and is supported by the top wall of cross beam 80 on the vehicle frame to thereby mount the tray to the vehicle.

As was indicated above, the tray 10 includes a semi-circular front wall 28, a bottom wall 29 and a back wall 30. As such, the tray 10 may be viewed as including a bottom wall 29 and a set of substantially vertical side walls surrounding the bottom wall 29. The set of substantially vertical side walls includes a back wall 30 which is attached to the front end of the vehicle and a pair of walls extending from opposite ends of the back wall 30 which together define the semi-circular front wall 28. Thus, the set of side walls may be viewed as defining a semi-circular border around the bottom wall 29.

As was also indicated above, the tray 10 has an outlet opening 37 which is positioned at the bottom center of the back wall 30 of the tray 10 and which is connected to the forward section 15A of the transfer system 15. As was further indicated above, the bottom wall 29 of the tray 10 includes discrete sloped sections 34 and 35, and the union between these sections may be viewed as channel-forming sections of the bottom wall 29. Thus the tray 10 may be viewed as further including a tray channel which is at least partially defined by the channel-forming sections of the bottom wall, and more particularly, a tray channel wheich is defined by the channel-forming sections of the bottom wall and the tray opening 37.

The tray opening 37 may be viewd as being defined, at least partially, by the tray channel's rear edge. In the embodiment illustrated in FIGS. 1–10, the tray opening 37 is also a wall opening in one of the side walls, and more particularly, the back wall 30.

The tray channel may be viewed as including a substantially planar lower wall sloping towards the tray opening 37. "Substantially planar" in this context does not necessarly imply flat, but instead is intended to mean a surface which does not experience any angular turns. Thus, under this definition, a semi-cylindrical shaped channel could be considered "substantially planar." Furthermore, while this lower wall is preferably sloping, rather than exactly horizontal, it is still closer to horizontal rather than vertical, or its slop is less than 45°, and more preferably less then 2020 . In this manner, the flow path of fruit through the tray opening 37 will be in substantially horizontal direction.

The forward section 15A of the transfer system 15 may also be viewed as having a lower wall which together with the lower wall of the channel forms a smooth transition surface, preferably in a substantially horizontal plane, between the tray and the transfer system. "Smooth transistion surface" in this context corresponds to a surface which is either flat or has a gentle slope, such as less than 45° from the horizontal. Thus if a connection between the tray opening 37 and the transfer section 15A included an elbow, a smooth transition surface would not be created.

When necessary, the tray 10 can be removed from the vehicle 9. For this purpose, the retention pins 82 are withdrawn from vertically upstanding posts 81. The tray 10 is then sufficiently elevated from the horizontal upper legs 77 of the respective mounting brackets to clear the posts 81 on the vehicle 9 to allow the tray to be removed. An alterante tray may then be mounted on the vehicle 9 while this alternate tray may have a different configuration from the tray removed, it preferably includes mounting brackets 75A and 75B of identical spacing. The alterante tray is lowered into position with the holes on the horiztonal legs 77 of the brackets respectively receiving the vertical posts 81 on the vehicle frame. The retention pins 82 are then placed through bores 83 in posts 81 to complete the mount.

The size and diesign of the alterante tray can be selected for the specific grove planting configuration being picked in order to maximize the efficiecy of the harvesting system and method. For example, in groves having aisles only slightly wider than the width of the vehicle. The width of the tray could be reduced. This width reduction would allow some clearance to the side and front of the tray to provide room for the people harvesting the trees. In addition, the shape of the tray can be varied depending upon the capacity desired therefor. Further, the position of the tray or trays relative to the vehicle can also be varied including, for example, alterante or additional trays mounted to the sides or back of the vehicle. The present tray system could also be added to a boom type picking and pruning machine to enhance its effectiveness for picking fruit from young trees or from the lower portions of more mature tall trees.

Figure 11:
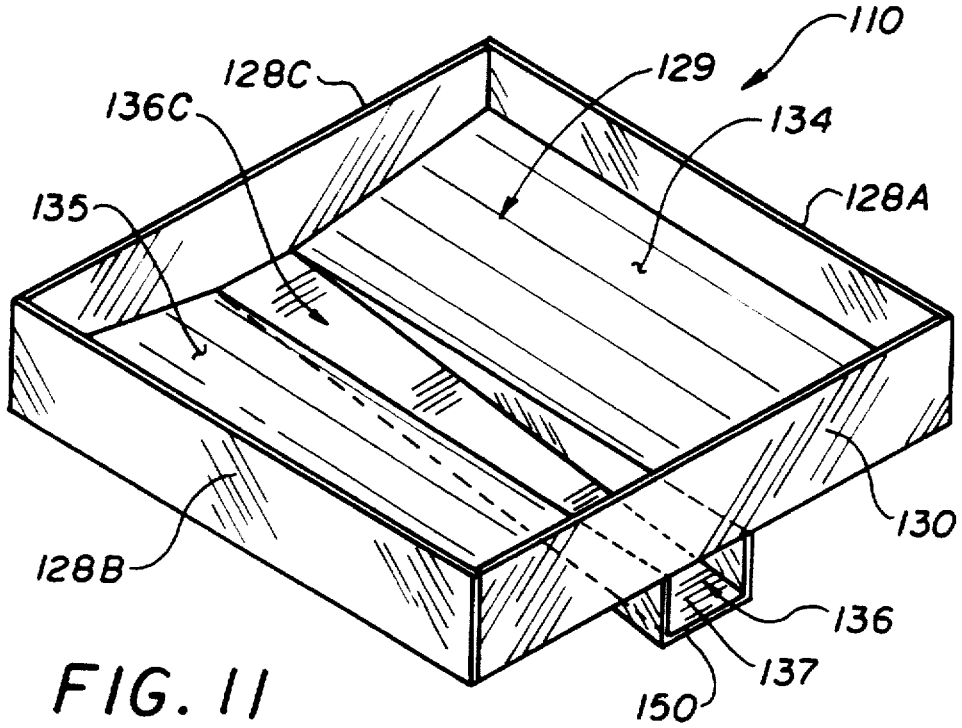
FIG. 11 is a perspective view of another tray which may be removably or permanently secured to the chassis frame of a fruit harvesting vehicle.
Figure 12:
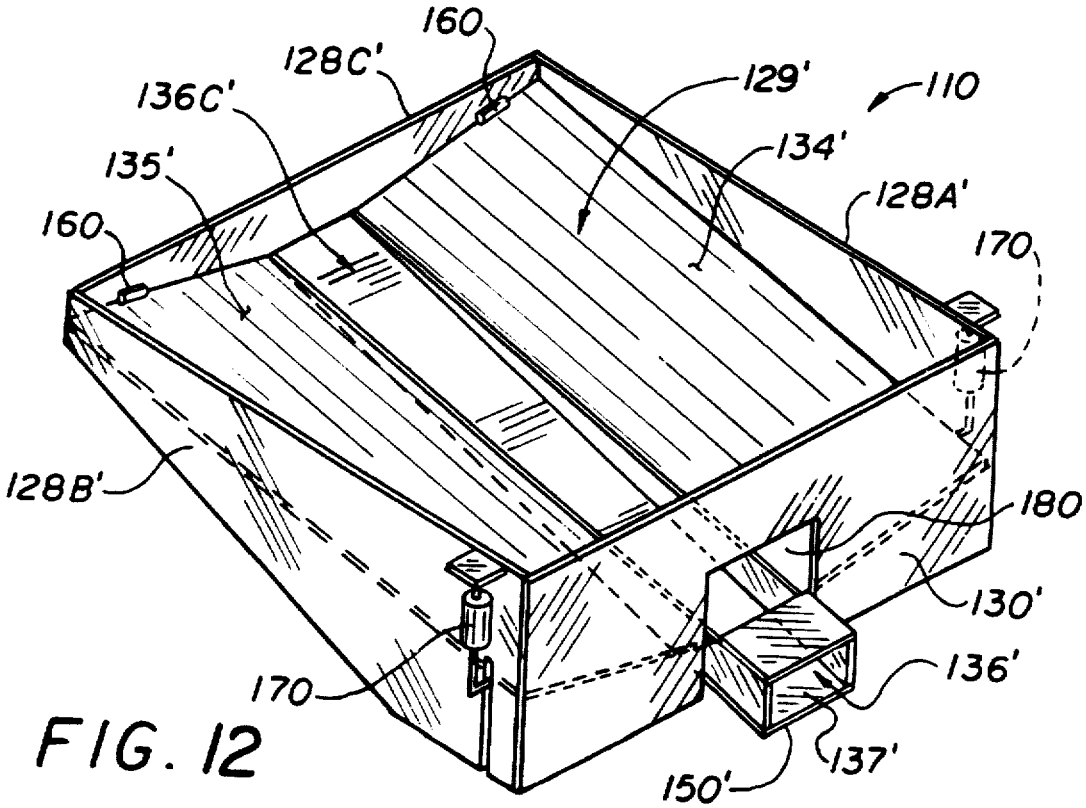
FIG. 12 is a perspective view of another tray which may be removably or permanently secured to the chassis frame of a fruit harvesting vehicle.
Figure 13:
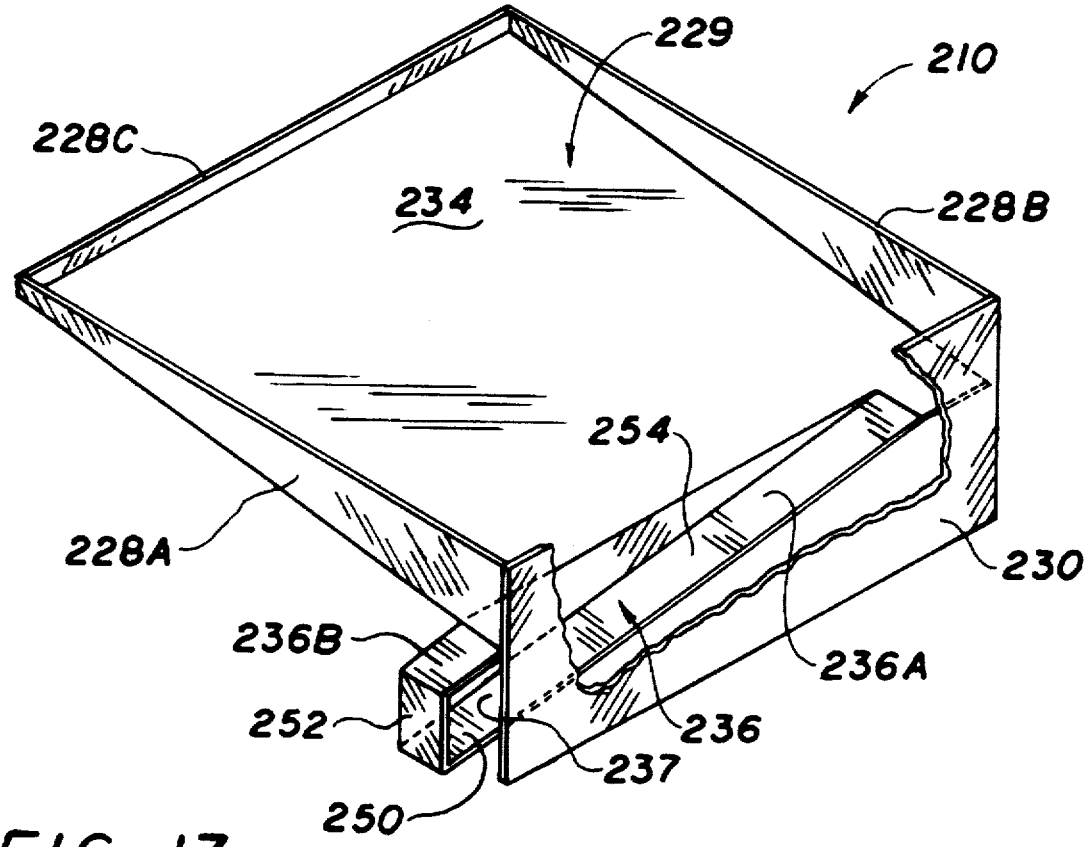
FIG. 13 is a perspective view of yet another tray which may be removably or permanently secured to the chassis frame of a fruit harvesting vehicle.

Turning now to FIGS. 11–13, some examples of alternative tray configurations are illustrated. Although not specifically shown in the drawings, these trays preferably include mounting components similar to those of the originally illustrated tray 10. The tray 110 shown in FIG. 11 includes a bottom wall 129 and a set of substantially vertical side walls surrounding the bottom wall 129. The set of side walls includes a back wall 130 which will be positioned adjacent to the front end of the vehicle 9 and a pair of walls 128A and 128B which extend from opposite ends of the back wall 130. The side walls 128A and 128B each extend perpendicularly outward from the opposite ends of the back wall 130 and these side walls, together with the back wall 130 and a third wall 128C, form a polygonal, or more particularly rectangular, border around the bottom wall 129. Such a polygonal or rectangular geometry may be desired over a semi-circular shape as it may allow a more efficient use of space in the aisle between the rows of citrus trees. Additionally, a rectangular tray will increase the area of the bottom will thereby more evenly distributing the received fruit.

The tray 110 further includes a channel 136 which is partially defined by channel-forming sections of the bottom will 129 and the bottom will includes sloping sections 134 and 135 which slope towards the tray channel 136. In this embodiment, the bottom will includes sloping sections 134 and 135 which slope towards the tray channel 136. In this embodiment, the bottom will 129 slopes toward the channel 136 but not towards the back wall 130 whereby the flow of fruit to the tray channel will be more gradual and even. The tray channel 136 includes a rear edge 150 defining the tray opening 137 which in the illustrated embodiment is positioned flush with the back wall 130 and this may alternatively be viewed as a part of the back wall whereby the back wall would include the tray opening 137. However, the tray opening 127 could also be positioned forward or rearward of the back wall 130 whereby the tray 110 could be used as the primary means for attaching the tray to a vehicle.

The tray channel 136 further includes a substantially palnar lower wall 136C sloping towards the tray opening 137. When the tray 110 is installed onthe vehicle, the lower wall of the forward section 15A of the transfer system 15 and the lower wall 136C will form a smooth transition surface between the tray 110 and the transfer system 15. In this manner, picked fruit placed in the tray 110 will travel down the sloped section 134/135, into the channel 136, through the tray opening 137, and smoothly into the duct transfer system 15. It may be noted for future reference that the slopped sections 134 and 135 slope towards the channel 136 but do not slope towards the back wall 130.

Referring now additionally to FIG. 12, another tray 110' for the fruit harvesting apparatus 8 is shown in perspective. The tray 110' is similar to the tray 110 shown in FIG. 11 and like reference numerals are used to designate like parts with the parts of the tray 110' being followed by a prime (') suffix. However, the opening 137' in the channel 136' is positioned forward of the back wall 130'. Additionally, the tray 110' further includes a slope-adjusting device for selectively adjusting the slope of one or more sections of the bottom wall 129'. Alterantively, the device could include a separate independent mechanism for adjusting the lower wall of the channel 136', to thereby control the amount of fruit flowing towards the tray opening 137'. (Slope-adjusting device in this context corresponds to any device, regardless of whether it is equivalent to the illustrated device, which may be used to selectively or automatically ajust the slope of one or more sections of the bottom wall of tray). For example, in FIG. 12 the sloped sections 134' and 135' are positioned so that they slope towards the channel 136' and also slope towards the back wall 130'.

In the illustrated embodiment, this slope-adjusting device includes pivot hinges 160 which pivotally connect the front edge of the bottom wall 129' to the front wall 128C' and a slope-determining assembly 170 which selectively pivots the bottom wall 129' relative to these pivot hinges 160. In this manner, the slope of the bottom wall 129' may be adjusted when fruit size and crew size warrant such adjustments. The illustrated slope-determining assembly 170 is in the form a drive cylinder for mechanically adjusting the slope of the bottom wall 129'. However, it may also be in the form of a pin-and-slot system for manual ajustments. Additoinally, the slope-determining assembly may also be in the form of a spring-system which automatically adjusts the slope of the relevant portions of the bottom will 130' depending on the weight of the picked fruit within the tray. The back wall 130' includes an opening 180 to accommodate the movement of the bottom wall 129' and the tray opening 137' will always move in a substantially vertical plan as the slope of the bottom wall 129' is being adjusted.

Referring now additionally to FIG. 13 another tray 210 for the fruit harvesting apparatus 8 is shown in perspective. The tray 210 includes a bottom wall 229 and a set of substantially vertical side walls surrounding the bottom wall 229. The set of side walls includes a back wall 230 which will be positioned adjacent the front end of the vehicle 9 and a pair of side walls 228A and 228B which extend from opposite ends of the back wall 230. The side walls 228A and 228B each extend perpendicularly outwardly from the opposite ends of the back wall 230 and these side walls, together with the back wall 230 and a third wall 228C, form a polygonal, or more particularly rectangular, border around the bottom wall 229.

The bottom wall 229 includes channel-forming sections which at least partially define a channel 236 and a sloping section 234 which slopes towards the tray channel 236. In this embodiment, the tray channel 236 is positioned adjacent and parallel to the back wall 230. As was indicated above, the tray opening may be positioned anywhere along the path of the tray channel (in front, in back, or aligned with the back/side wall of the tray) as required by the needs of the specific piece of equipment. In FIG. 13, the tray opening 237 is located beyond the side all 228A of the tray 210 whereby this tray may accommodate a vehicle in which the transfer system is not centrally located.

The tray channel 236 also includes a substantially planar lower wall 236A sloping towards the tray opening 237. In the assembled fruit harvesting apparatus, this lower wall 236A and the lower wall of the forward section 15A of the transfer system will form a smooth transition surface between the tray 210 and the transfer system 15.

Figure 15:
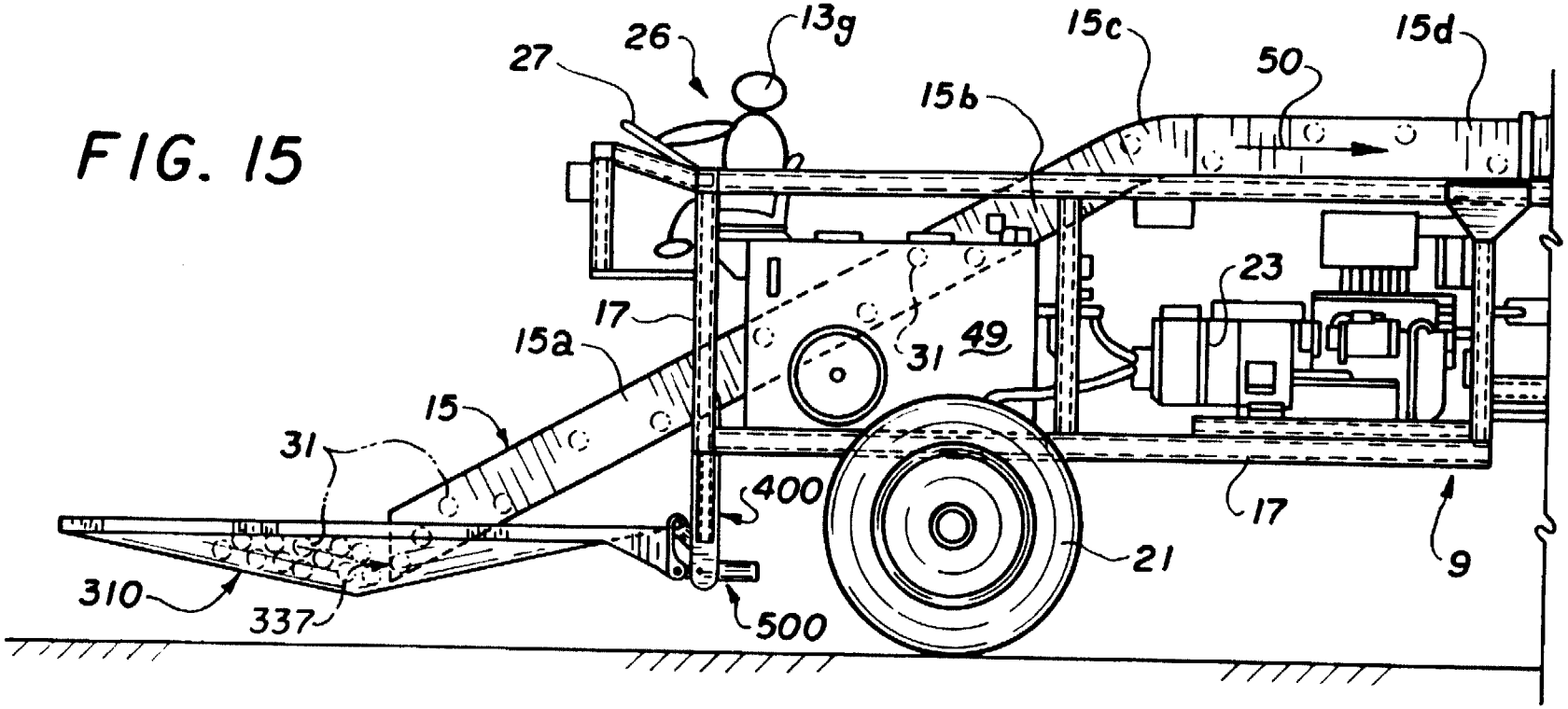
FIG. 15 is an exploded view of a tray according to another embodiment of the invention, along with appropriate portions of the vehicle frame.
Figure 16:
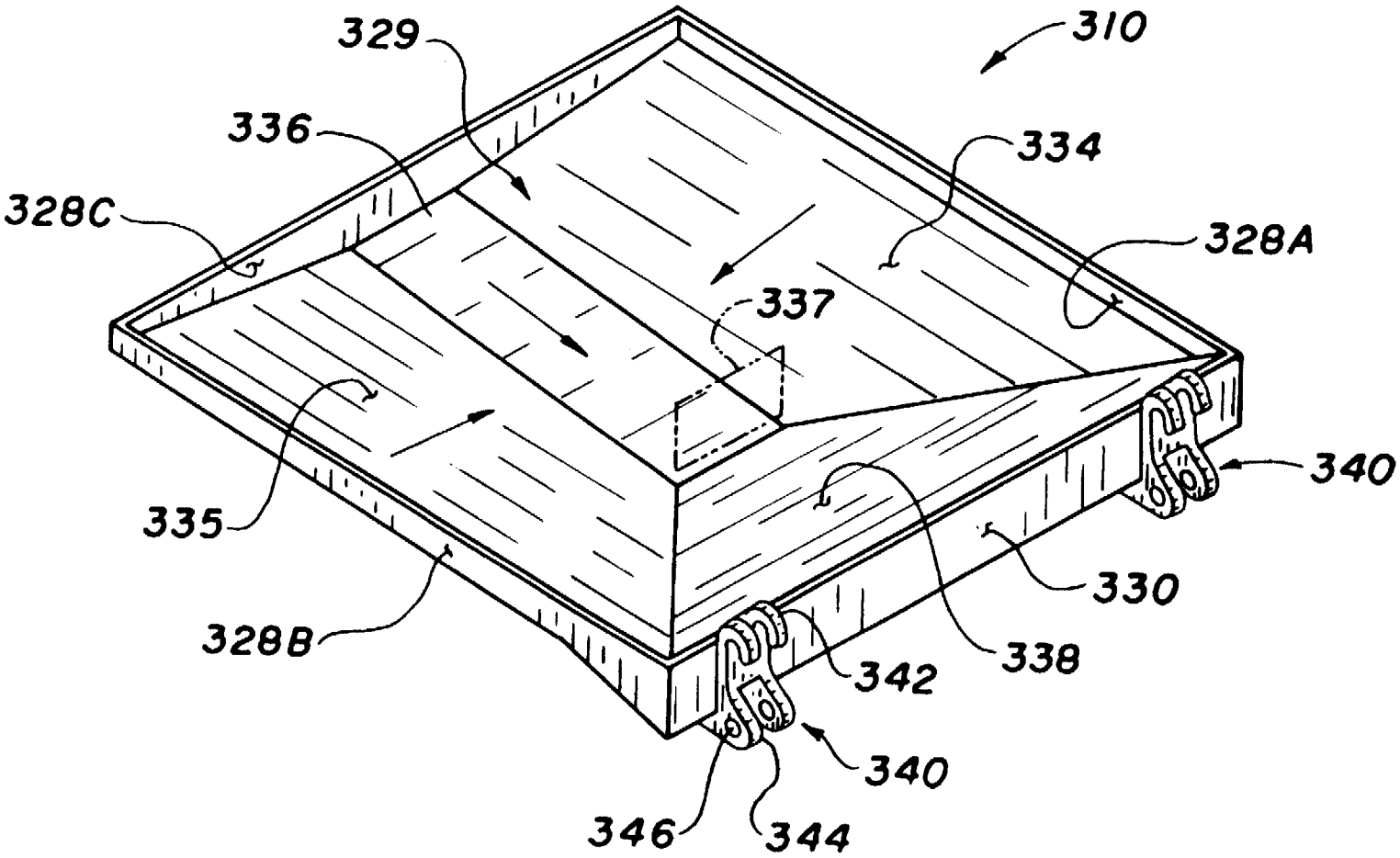
FIG. 16 is a perspective view of the tray of FIG. 15.

Referring now additionally to FIGS. 15 and 16, another tray 310 for the fruit harvesting apparatus 8 is shown. The tray 310 includes a bottom wall 329 and a set of saide walls extending from the bottom wall 329. The present invention contemplates a variety of configurations for the set of side walls. For example, the side walls may simply constitute rolled/slanted edges of the bottom wall 329 and/or extend only from certain portions of the bottom wall. However, they are preferably substantially vertical and surround the bottom wall 329. Additionally, the set of side walls preferably includes a back wall 330 which will be positioned adjacent to the front end of the vehicle 9 and a pair of walls 328A and 328B which extend from opposite ends of the back wall 330. The side walls 328A and 328B each extend perpendicularly outward from the opposite end of the back wall 330 and these side walls, together with the back wall 330 and a third wall 328C form a polygonal, or more particularly rectangular border around the bottom wall 329. The side walls are preferably approximately five to eight inches tall. as is explained in more detail below, the tray 310 can be used with certain vehicles that cannot accommodate a tray with an opening in a back wall or side wall.

The tray 310 further includes a channel 336 which is partially defined by channel-forming sections of the bottom wall 329 and the bottom wall includes sloping sections 334, 335, and 338 which slope toward the channel 336. More specifically, the sloping section 338 slopes downwardly from the back wall to the channel 336. The sloping sections 334 and 335 preferably slope toward the channel 336 but not towards the back wall 330. This arrangement is believed to make the flow of fruit to the tray channel more gradual and even. Although the channel-forming sections of the bottom wall 329 are illustrated as forming a distinctly separate and essentially "stepped" channel, such an exaggerated form should not be interpreted as necessary to qualify as a channel-forming section under the present invention. Instead, any sections of the bottom wall which form a union for fruit flow may qualify as channel-forming sections. For example, the bottom wall could slope towards a back wall or a side wall and connect with the back wall or side wall to form a channel to guide fruit to the tray outlet.

As best seen in FIG. 15, the first section 15A of the duct transfer system 15 extends over one of the side walls, namely the back wall 330, and is positioned so that a smooth transition surface is formed between the tray 310 and the transfer system 15. The tray outlet 337 (or transfer system inlet) may be defined as the point at which the transfer system 15 effectively connects the channel 336 to the hopper. This point may be anywhere along the path of the tray channel as required by the needs of the specific piece of equipment.

In the tray 310, the primary means for attaching the tray to a vehicle is located on the back wall 330. More particularly, a pair of brackets 340 are attached the back wall 330. Each bracket 340 includes a hook portion 342 and a pivot portion 344 which includes a rod-receiveing channel 346. As is explained in more detail below, these portions of the brackets 340 coordinated to attach the tray 310 to the vehicle and to allow the appropriate manipulation of the tray during operation of the apparatus.

Figure 17A:
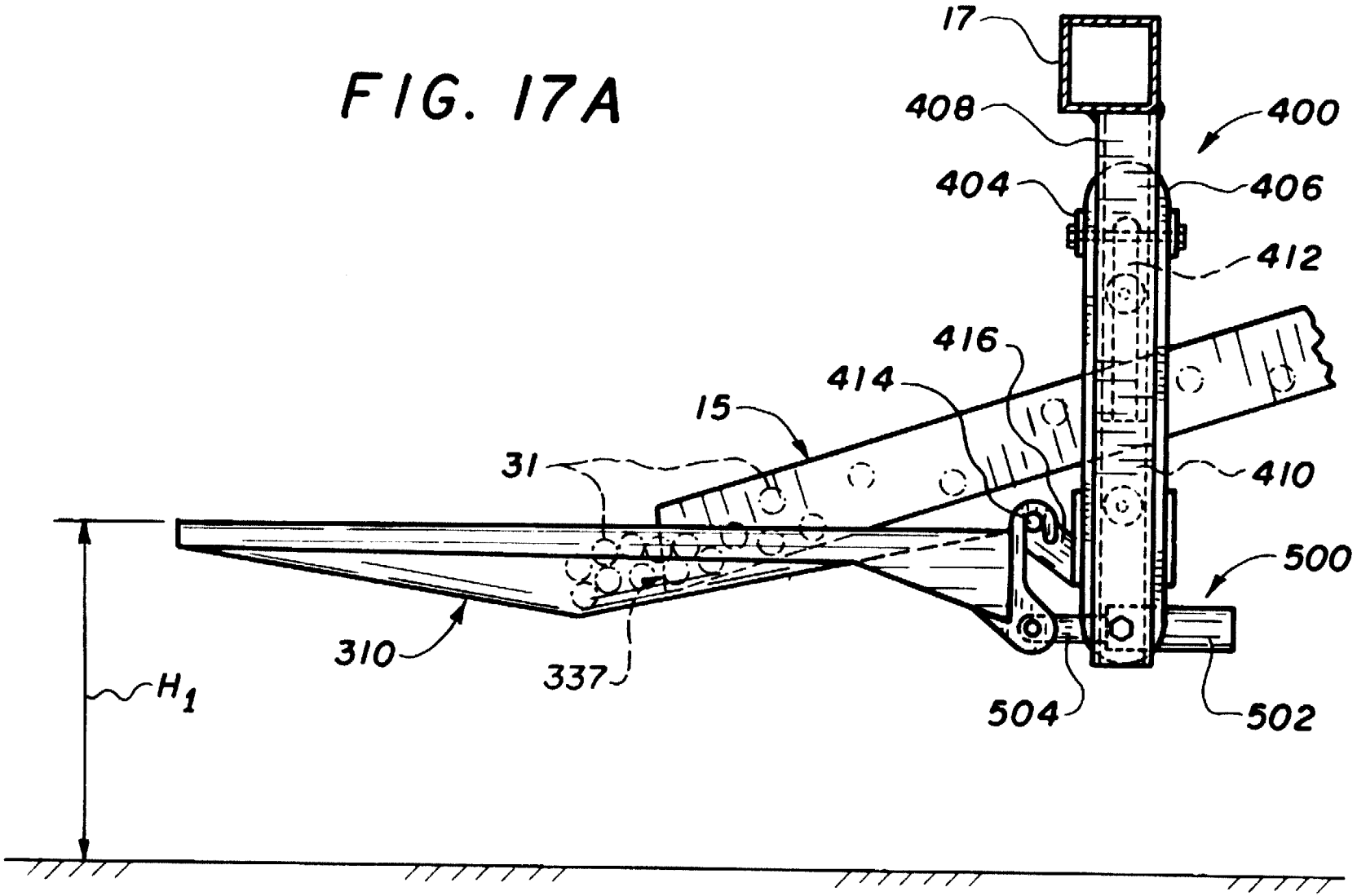
FIG. 17A is a side view of the tray of FIG. 15 and appropriate portions of the vehicle frame, the tray being shown in an elevated and non-tilted condition.
Figure 17B:
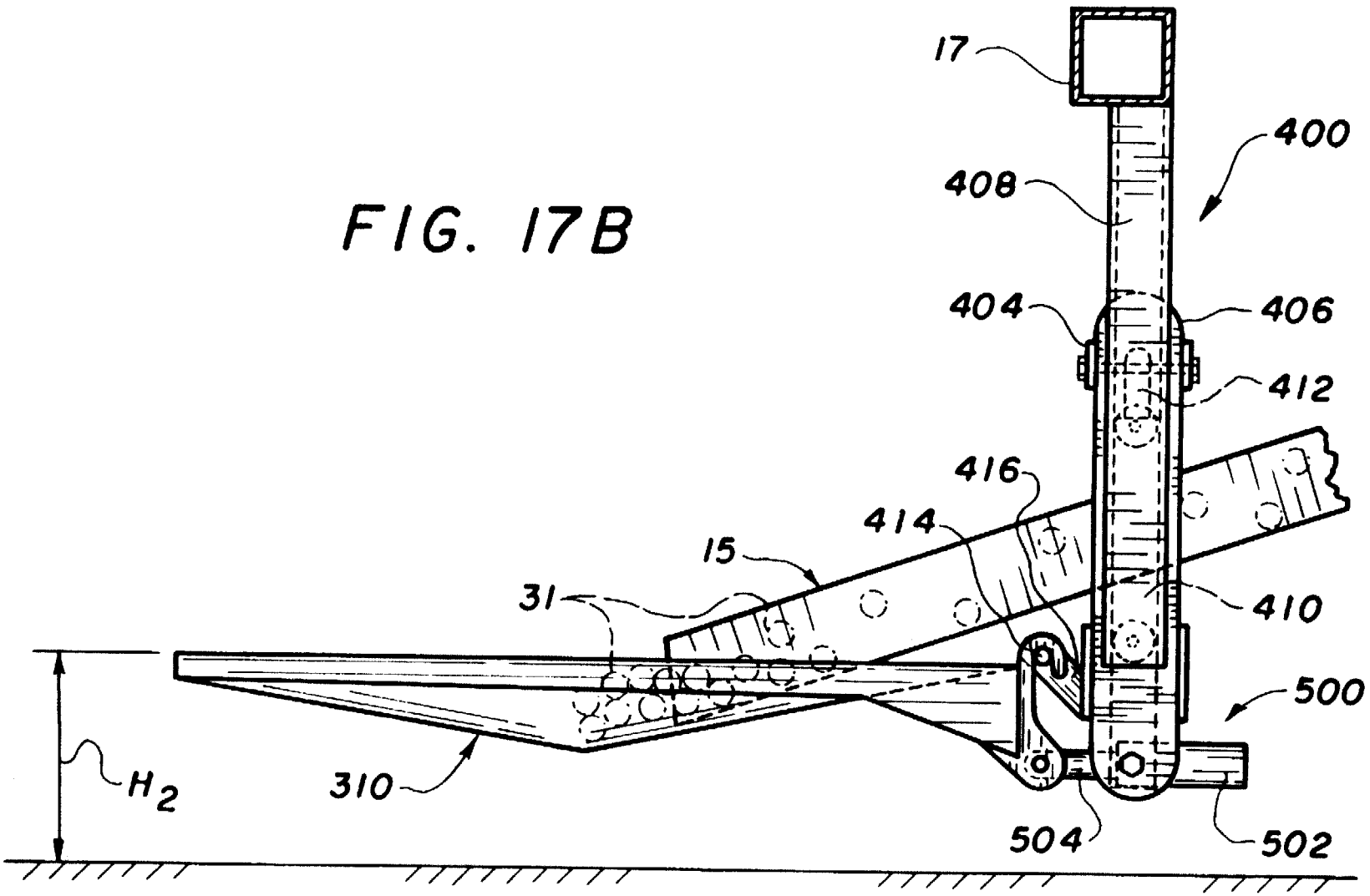
FIG. 17B is a view similar to FIG. 17A, exept that the tray is shown in a non-elevated and non-tilted condition.
Figure 17C:
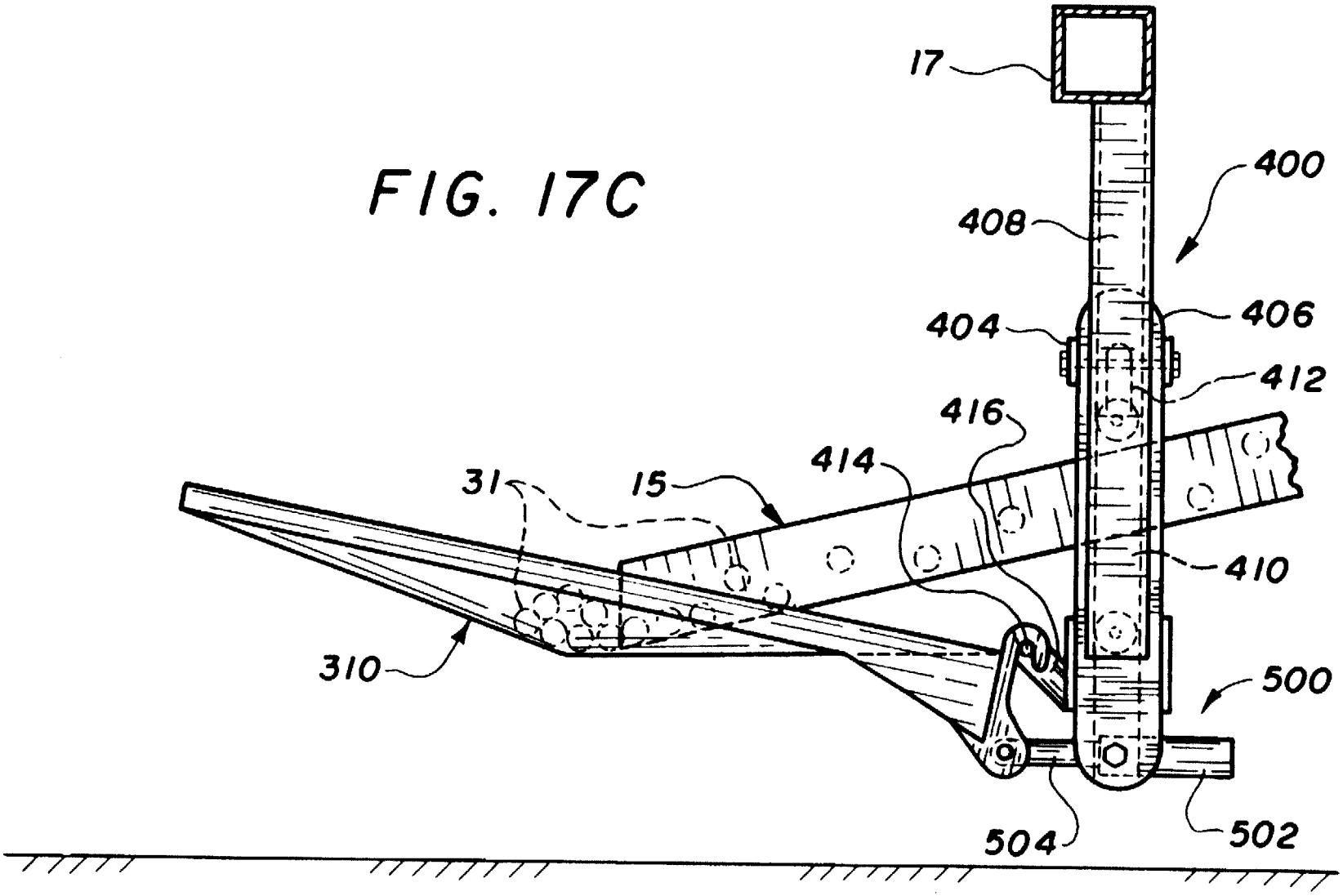
FIG. 17C is a view similar to FIGS. 17A and 17B. except that the tray is shown in a non-elevated, but tilted condition.
Figure 18:
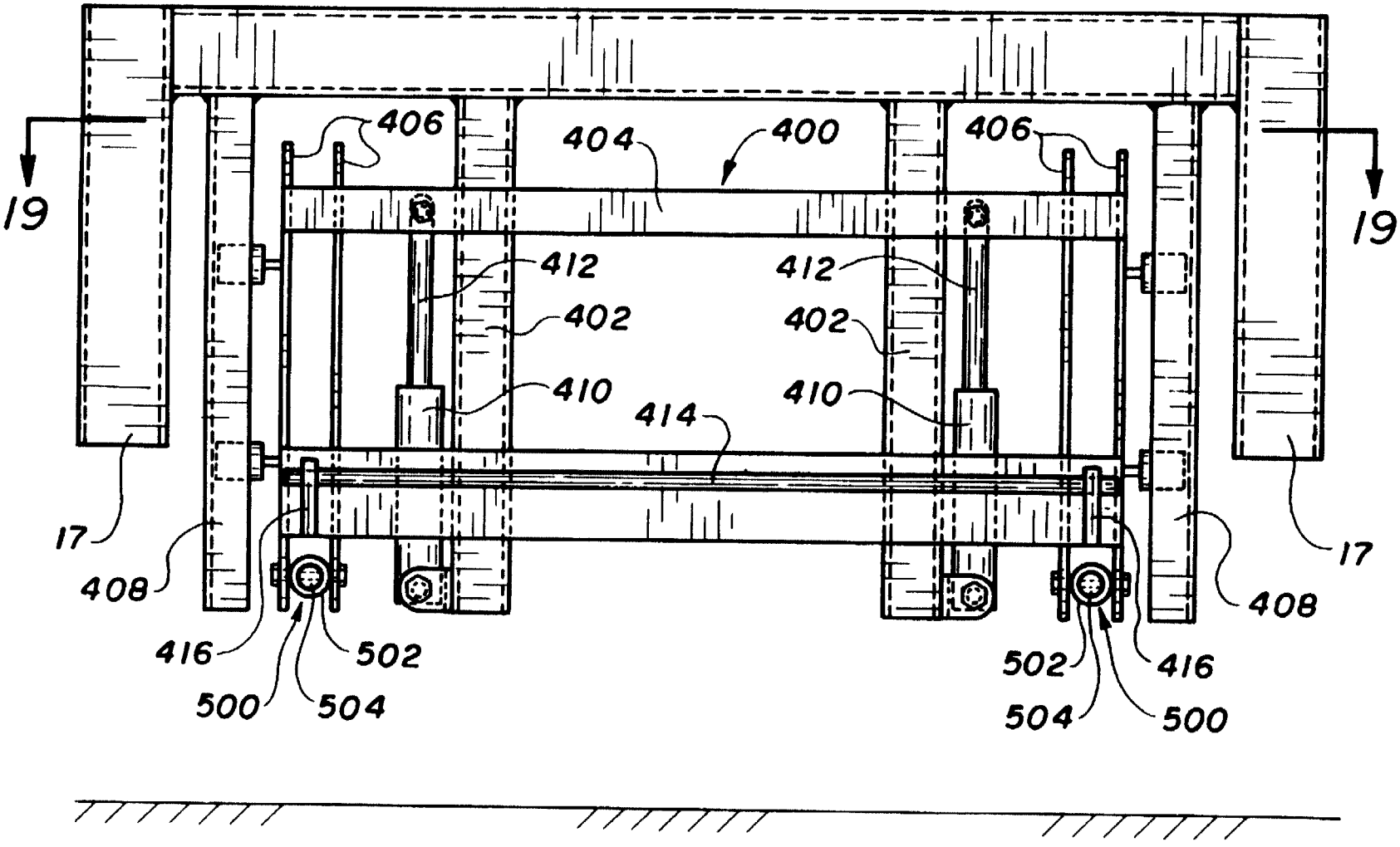
FIG. 18 is a front view of the elevating device, the tilting device,and appropriate portions of the vehicle frame.
Figure 19:
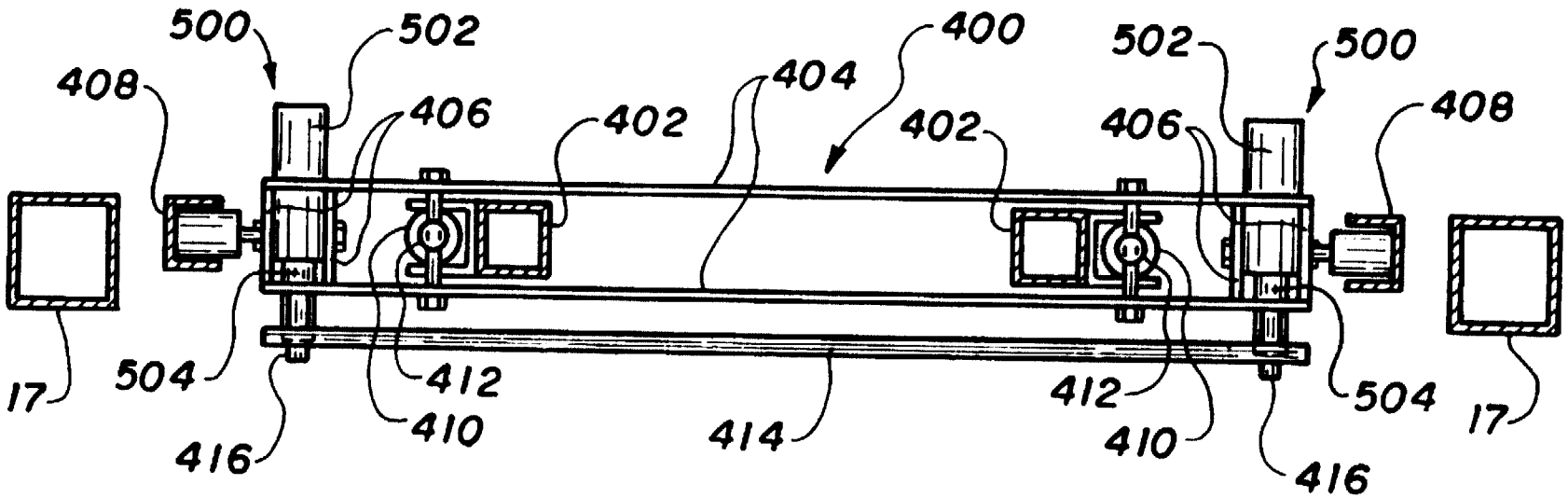
FIG. 19 is a sectional view of the elevating device, the tilting device, and appropriate portions of the vehicle as seen along the line 19—19 in FIG. 18.

Turning now to FIGS. 17–19, the tray-manipulation assemblies of the present invention are shown in detail. The manipulation assemblies particularly include an elevating assembly 400 which selectively elevates the tray 310 and a tilting assembly 500 which selectively tilts the tray 310. Although the assemblies 400 and 500 are shown in conjunction with tray 310, it should be understood that such assemblies may be used with any of the trays described above and/or any other suitable tray.

As was alluded to above, the elevating assembly 400 selectively elevates the top edge of the tray 310 between a first height $H_1$ from the ground (see FIG. 17A) and a second height $H_2$ (see FIG. 17B). The tray 310 would be elevated to the $H_1$ height when, for instance, the harvesting apparatus is being moved down the aisle and the tray 310 would be elevated to the $H_2$ height when, for instance, the harvesting apparatus is being kept stationary and fruit picking is being performed. Preferably, although no specifically shown in the drawings, the elevating assembly 400 elevates the top edge of the tray between a height of thirty inches (measure from the ground) and a height corresponding to one in which the bottom wall rests on the ground. As was indicated above, the side walls of the tray 310 are preferably approximately five-eight inches tall, whereby the elevating assembly 400 elevates the bottom wall 329 between a height twenty-two–twenty five inches and a height of an inch or less from the ground.

The elevating assembly 400 includes stationary vertical frame members 402, a movable horizontal cross-bar 404, a pair of vertical brackets 406, and a pair of vertical side members 408, the arrangement of which is best explained by referring to FIG. 18. Although not specifically shown in the drawing, the vertical frame members 402 are secured to an upper portion of the front chassis assemby 17 of the vehicle 9. A rod-cylinder unit, or more particlularly the cylinder 410 of each unit, is secured to each of the stationary frame members 402 in such a manner that the rod 412 of the unit is selectively movable in the vertical direction. The rods 412 are attached to the horizontal cross-member 404 which is attached to the vertical brackets 406 which is attached the side members 408. A horizontal bar 414 extends between the side member 408 and the tray 310 is attached to the vehicle 9 by hooking the hook porton 342 of the tray 310 to the rod 414. As the rod 412 of the cylinder-rod unit is vertically moved, the cross-member 404 is moved, which in turn moves the vertical brackets 406 and the side members 408 and the tray 310. Thus, the tray 310 may be selectively elevated.

Also as was indicated above, the tilting assembly 500 selectively tilts the tray 310 between a horizontal position (FIGS. 17A and 17B) and a position offset from the horizontal position (FIG. 17C). The tilting assembly 500 includes a pair of cylinder-rod units each having a cylinder 502 secured to movable components of the elevating assembly 400 and a rod 504 secured to the tray 310. More particularly, the cylinder 502 is positioned between the parts of the vertical brackets 406 and secured thereto. The rods 504 are secured to the tray 310 by locking pins (not specifically shown) which each extend through a respective rod 504 and the channel 346 of the pivot portion 344 of the corresponding tray bracket 340. In this manner, the tray 310 may be tilted to the desired angle at the desired elevation.

Although not specifically shown in the drawings, the tilting assembly 500 preferably tilts the tray 310 between a horizontal position and a position 90° offset from the horizontal position.

Figure 20:
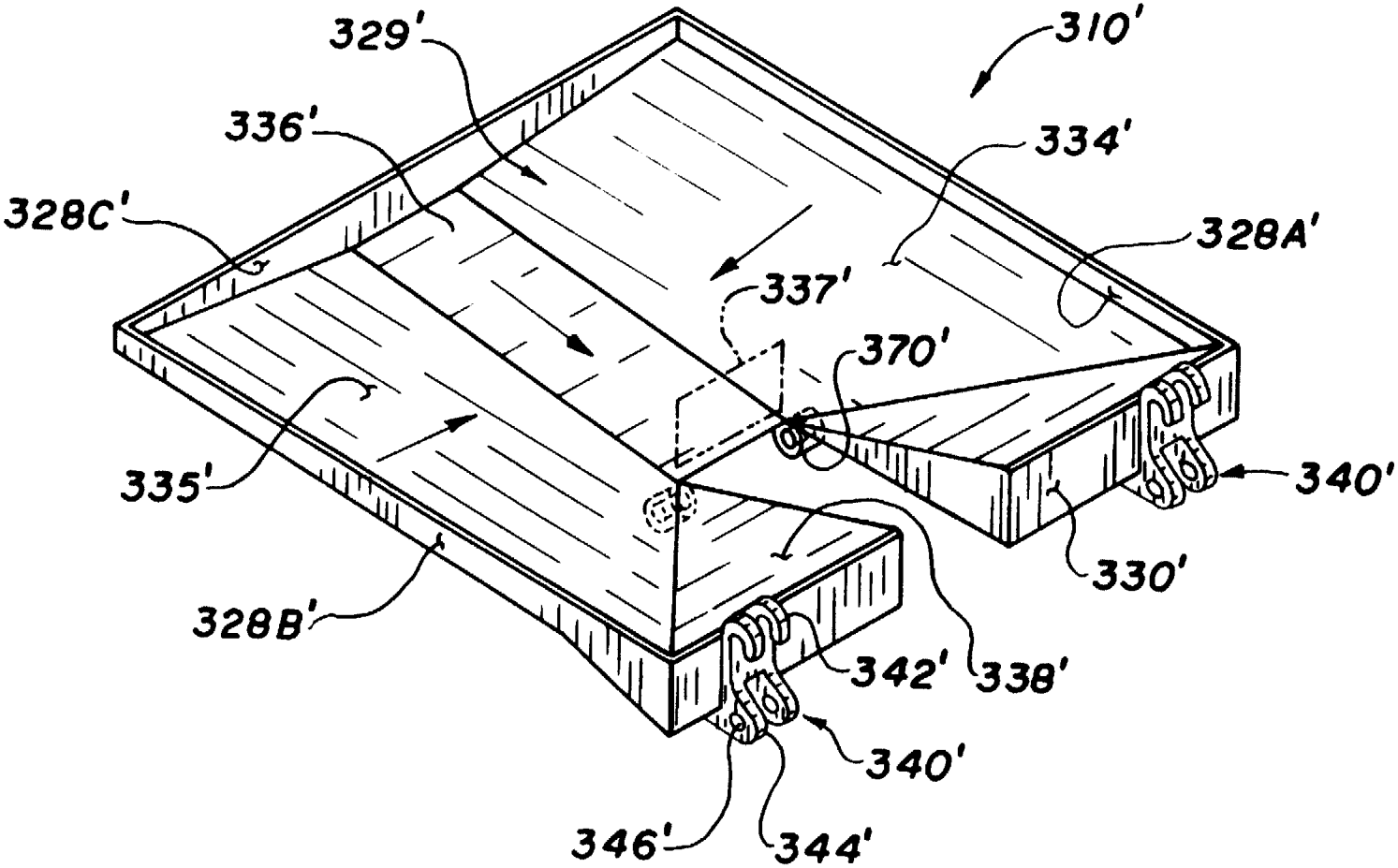
FIG. 20 is a perspective view of a modified form of the tray of FIG. 16.

Turning now to FIG. 20, a modified version 310' of the tray is shown. The tray 310' includes many of the same components as the tray 310 and thus like reference numerals are used to designate like parts, with the parts of tray 310' being designated by a prime (') suffix. However, the back wall 330' is interrupted to form a indentation which receives the first section 15A of the duct transfer system 15. Suitable fastening elements 370' may be used, if necessary, to secure the section 15A to the tray 310 to form the tray outlet. In this embodiment, the bottom wall 336' can rests on the ground and the transfer system is attached to the opening, and thus this tray will get closer to the ground.

One may now appreciate that the present invention provides a fruit bearing harvesting apparatus which enables multiple workers to more efficiently pick and collect citrus fruit from citrus trees. Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the following claims.

What is claimed is:

1. A fruit harvesting apparatus comprising a vehicle having a front end and a back end means for moving the vehicle along the ground; a tray, coupled to the vehicle, for receiving picked fruit, a pivotable hopper, mounted to the back end of said vehicle, for temporarily storing the picked fruit; a transfer system for transferring the picked fruit from said tray to said hopper, an an elevating assembly which selectively elevates said tray;

wherein said tray includes a bottom wall and a set of side walls extending from said bottom wall;

wherein at least one of said side walls defines a top edge of said tray;

wherein said elevating assembly elevates said top edge of said tray between a first height $H_1$ from the ground and a second height $H_2$ from the ground;

wherein said transfer system connects with said tray in such a manner that a smooth transition surface is formed between said tray and said transfer system; and wherein said transfer system extends from a tray outlet to said hopper.

2. A fruit harvesting system as set forth in claim 1 wherein said first height $H_1$ is approximately equal to thirteen inches or less and said second height $H_2$ is at least five inches greater than said first height $H_1$.

3. A fruit harvesting system as set forth in claim 2 wherein the height of said bottom wall of said tray from the ground is one inch or less when said elevating assembly elevates said top edge of said tray to said first height $H_1$.

4. A fruit harvesting apparatus as set forth in claim 1 wherein said tray further includes a channel formed at least partially by channel-forming sections of said bottom wall and wherein said bottom wall further includes at least one sloping section which slopes towards said channel.

5. A fruit harvesting apparatus as set forth in claim 1 wherein said set of side walls are substantailly vertical, surrond the bottom wall, and together define a polygonal border around said bottom wall.

6. A fruit harvesting apparatus as set forth in claim 5 wherein said set of side walls together define a rectangular border around said bottom wall.

7. A fruit harvesting apparatus set forth in claim 1 further comprising a tilting assembly which selectively tilts said tray.

8. A fruit harvesting apparatus comprising a vehicle having a front end and a back end; means for moving the vehicle along the ground; a tray, coupled to the vehicle, for receiving picked fruit; a pivotable hopper, mounted to the back end of said vehicle, for temporarily storing the picked fruit; a transfer system for transferring the picked fruit from said tray to said hopper, and a tilting assembly which selectively tilts said tray;

wherein said tray includes a bottom wall and a set of side walls extending from said bottom wall, wherein said transfer system connects with said tray in such a manner that a smooth transition surface is formed between said tray and said transfer system; and wherein said transfer system extends from a tray outlet to said hopper.

9. A fruit harvesting system as set forth in claim 8 wherein said tilting assembly tilts said tray between a horizontal position and a position offset from the horizontal position.

10. A fruit harvesting apparatus as set forth in claim 8 further comprising an elevating assembly which selectively elevates said tray.

11. A fruit harvesting apparatus comprising a vehicle, means to move that vehicle along the ground, a tray mounted to the vehicle adjacent the ground to receive picked fruit, the tray having a sloped bottom wall to convey the received fruit to a first end of a transfer means, means to convey the fruit from said first end of said transfer means to a second end of said transfer means, said second end of said transfer means being coupled to a hopper carried by said vehicle, the hopper temporarily storing the picked fruit;

wherein the hopper is pivotally connected to the vehicle adjacent the back end thereof and may be selectively moved about the pivotal connection to remove the fruit temporarily stored therein; and wherein the tray is supported by a vertically movable frame assembly which selectively elevates said tray.

12. A fruit harvesting apparatus as set forth in claim 11 further comprising a tilting assembly which selectively tilts said tray.

13. A fruit harvesting apparatus as set forth in claim 11 wherein the first end of said transfer means is pivotally mounted to the tray.

14. A fruit harvesting apparatus as set forth in claim 11 wherein the backward portion of the second section of the transfer system is pivotally mounted to the vehicle.

15. A fruit harvesting apparatus comprising a vehicle having a front end and a back end; means for moving the vehicle along the ground; a tray, coupled to the vehicle, for receiving picked fruit; a pivotable hopper, mounted to the back end of the said vehicle, for temporarily storing the picked fruit; and a transfer system for transferring the picked fruit fron said tray to said hopper;

wherein said tray includes a bottom wall and a set of side walls extending from said bottom wall;

wherein said transfer system extends over a side wall and is positioned in such manner that a smooth transition surface is formed between a tray outlet and said transfer system; and wherein said transfer system extends from said tray to said hopper.

16. A fruit harvesting apparatus as set forth in claim 15 wherein said transfer system includes a conveyer which conveys the fruit.

17. A fruit harvesting apparatus comprising a vehicle having a front end and a back end; means for moving the vehicle along the ground; a tray, coupled to the vehicle, for receiving picked fruit; a pivotable hopper, mounted to the back end of said vehicle, for temporarily storing the picked fruit; and a transfer system for transferring the picked fruit from said tray to said hopper;

wherein said tray includes a bottom wall and a set of side walls extending from said bottom wall;

wherein said transfer system extends from a tray outlet, over one of said walls, and to said hopper.

18. A fruit harvesting apparatus as set forth in claim 17 wherein said transfer system is connected with said tray in such a manner that a smooth transition surface is formed between said tray and said transfer system.

19. A fruit harvesting appartus as set forth in claim 18 wherein said set of side walls includes a back wall portioned adjacent to said front end of said vehicle, and wherein said transfer system extends over said back wall.

20. A fruit harvesting apparatus comprising a vehicle, means to move that vehicle along the ground, a tray mounted to the vehicle adjacent the ground to receive picked fruit, said tray having a sloped bottom wall which conveys the received fruit to a first end of a transfer system and a set of side walls which extend from said bottom wall, means to convey the fruit from said first end of said transfer system to a second end of said transfer system, said second end of said transfer system depositing the fruit to a hopper carried by said vehicle;

wherein said transfer system extends from a tray outlet, over one of said side walls, and to said hopper; and wherein the hopper is pivotally connected to the vehicle adjacent the back end thereof and may be selectively moved about the pivotal connection to remove the fruit temporarily stored therein.

21. A fruit harvesting apparatus as set forth in claim 20 wherein set of side walls includes a back wall positioned adjacent to said vehicle, and wherein said transfer system extends over said back wall.

22. A fruit harvesting apparatus comprising a vehicle, means to move that vehicle along the ground, a tray which is mounted to the vehicle adjacent the ground to receive picked fruit, said tray having a bottom wall which conveys the received fruit to a first end of a transfer system, means to convey the fruit from said first end of said transfer system to a second end of said transfer system, said second end of said transfer system depositing the fruit to said hopper carried by said vehicle;

wherein the hopper is pivotally connected to the vehicle adjacent the back end thereof and may be selectively moved about that pivotal connection to remove the fruit temporarily stored therein;

wherein the tray connects with a frame assembly to allow the tray to be selectively elevated.

23. A fruit harvesting apparatus as set forth in claim 22 wherein the tray is supported by a vertically movable frame assembly to allow the tray to be selectively elevated.

24. A fruit harvesting apparatus as set forth in claim 22 wherein the transfer system is a converyor depositing the fruit to the hopper.

25. A fruit harvesting apparatus as set forth in claim 22 wherein the transfer system pneumatically conveys the fruit to the hopper.

26. A fruit harvesting apparatus comprising a vehicle, means to move that vehicle along the ground, a tray which is mounted to the vehicle adjacent the ground to receive picked fruit, said tray having a bottom wall which conveys the received fruit to a first end of a transfer system, means to convey the fruit from said first end of said transfer system to a second end of said transfer system, said second end of said transfer system depositing the fruit to said hopper carried by said vehicle;

wherein the hopper is pivotally connected to the vehicle adjacent the back end thereof and may be selectively moved about that pivotal connection to remove the fruit temporarily stored therein; and wherein the tray connects with a frame assembly to allow the tray to be selectively tilted.

27. A fruit harvesting apparatus as set forth in claim 26 wherein the tray is pivotally connected to the vehicle to allow the tray to be selectively filled.

28. A fruit harvesting apparatus as set forth in claim 26 wherein the transfer system is a conveyor depositing the fruit to the hopper.

29. A fruit harvesting apparatus as set forth in claim 26 wherein the transfer system pneumatically conveys the fruit to the hopper.

*30. A fruit harvesting apparatus comprising a vehicle, means to move that vehicle along the ground, a tray which is mounted to the vehicle adjacent the ground to receive picked fruit, said tray having a bottom wall which conveys the received fruit to a first end of a transfer system, means to convey the fruit from said first end of said transfer system to a second end of said transfer system, said second end of said transfer system depositing the fruit to said hopper carried by said vehicle;*

*wherein the hopper is connected to the vehicle adjacent the back end thereof and may be selectively elevated to facilitate removal of the fruit temporarily stored therein;*

*wherein the tray connects with a frame assembly to allow the tray to be selectively elevated.*

*31. A fruit harvesting apparatus as set forth in claim 30 wherein the tray is supported by a vertically movable frame asseambly to allow the tray to be selectively elevated.*

*32. A fruit harvesting apparatus as set forth in claim 30 wherein the transfer system is a conveyor depositing the fruit to the hopper.*

*33. A fruit harvesting apparatus as set forth in claim 30 wherein the transfer system pneumatically conveys the fruit to the hopper.*

*34. A fruit harvesting apparatus comprising a vehicle, means to move that vehicle along the ground, a tray which is mounted to the vehicle adjacent the ground to receive picked fruit, said tray having a bottom wall which conveys the received fruit to a first end of a transfer system, means to convey the fruit from said first end of said transfer system to a second end of said transfer system, said second end of said transfer system depositing the fruit to said hopper carried by said vehicle;*

*wherein the hopper is connected to the vehicle adjacent the back end thereof and may be selectively elevated to facilitate removal of the fruit temporarily stored therein;*

*wherein the tray connects with a frame assembly to allow the tray to be selectively tilted.*

*35. A fruit harvesting apparatus as set forth in claim 34 wherein the tray is supported by a vertically movable frame assembly to allow the tray to be selectively tilted.*

*36. A fruit harvesting apparatus as set forth in claim 34 wherein the transfer system is a conveyor depositing the fruit to the hopper.*

*37. A fruit harvesting apparatus as set forth in claim 34 wherein the transfer system pneumatically conveys the fruit to the hopper.*

*38. A fruit harvesting apparatus comprising a vehicle having a front end and a back end; means for moving the vehicle along the ground; a tray, coupled to the vehicle, for receiving picked fruit; a hopper, mounted to the back end of said vehicle, for temporarily storing the picked fruit; a transfer system for transferring the picked fruit from said tray to said hopper, and a tilting assembly which selectively tilts said tray;*

*wherein said tray includes a bottom wall and a set of side walls extending from said bottom wall,*

*wherein said transfer system connects with said tray in such a manner that a smooth transition surface is formed between said tray and said transfer system; and*

*wherein said transfer system extends from a tray outlet to said hopper.*

*39. A fruit harvesting system as set forth in claim 38 wherein said tilting assembly tilts said tray between a horizontal position and a position offset from the horizontal position.*

*40. A fruit harvesting apparatus as set forth in claim 38 further comprising an elevating assembly which selectively elevated said tray.*

*41. A fruit harvesting apparatus comprising a vehicle having a front end and a back end; means for moving the vehicle along the ground; a tray, coupled to the vehicle, for receiveing picked fruit; a hopper, mounted to the back end of said vehicle, for temporarily storing the picked fruit; a transfer system for transferring the picked fruit from said tray to said hopper, an elevating assembly which selectively elevates said tray;*

*wherein said tray includes a bottom wall and a set of side walls extending from said bottom wall,*

*wherein at least one of said side walls defines a top edge of said tray;*

*wherein said elevating assembly elevates said top edge of said tray between a first height* $H_1$ from the ground and a second height $H_2$ from the ground;

*wherein said transfer system connects with said tray in such a manner that a smooth transition surface is formed between said tray and said transfer system; and*

*wherein said transfer system extends from a tray outlet to said hopper.*

*42. A fruit harvesting system as set forth in claim 41 wherein said elevating assembly tilts said tray between a horizontal position and a position offset from the horizontal position.*

*43. A fruit harvesting apparatus as set forth in claim 41 further comprising a vertical elevating assembly which selectively elevates said tray.*

* * * * *